US012578057B2

(12) United States Patent
Mercer et al.

(10) Patent No.: US 12,578,057 B2
(45) Date of Patent: Mar. 17, 2026

(54) SUBSURFACE GAS STORAGE SYSTEM

(71) Applicants: Michael D. Mercer, Edmond, OK (US); Ronald R. Mercer, Nichols Hills, OK (US)

(72) Inventors: Michael D. Mercer, Edmond, OK (US); Ronald R. Mercer, Nichols Hills, OK (US)

( * ) Notice: Subject to any disclaimer, the term of this patent is extended or adjusted under 35 U.S.C. 154(b) by 117 days.

(21) Appl. No.: 18/673,613

(22) Filed: May 24, 2024

(65) Prior Publication Data

US 2024/0318781 A1 Sep. 26, 2024

Related U.S. Application Data

(63) Continuation-in-part of application No. 18/125,567, filed on Mar. 23, 2023, now Pat. No. 12,025,277.
(Continued)

(51) Int. Cl.
*F17C 1/00* (2006.01)

(52) U.S. Cl.
CPC ...... *F17C 1/007* (2013.01); *F17C 2203/0639* (2013.01); *F17C 2221/012* (2013.01);
(Continued)

(58) Field of Classification Search
CPC .......... F17C 2221/012; F17C 2221/033; F17C 2221/016; F17C 2221/017; F17C 2221/035
See application file for complete search history.

(56) References Cited

U.S. PATENT DOCUMENTS 2,066,517 A 1/1937 Campbell
2,332,462 A 10/1943 Nilson
(Continued)

FOREIGN PATENT DOCUMENTS

DE 69505802 T2 4/1999
EP 1435481 A1 7/2004
(Continued)

OTHER PUBLICATIONS

English translation KR-200315889-Y1 (Year: 2003).*
PCT/US2023/016129; "International Search Report and Written Opinion"; mailed Jun. 12, 2023; 13 pages.

*Primary Examiner* — Jason L Vaughan
*Assistant Examiner* — Amanda Kreiling
(74) *Attorney, Agent, or Firm* — Hall Estill Law Firm

(57) ABSTRACT

Apparatus for subsurface storage of hydrogen, compressed natural gas, and/or other high pressure gases. A storage module has a rigid outer casing which surrounds a rigid inner liner to define a sealed interior gas storage space within the inner liner and a sealed annulus space between the inner liner and the outer casing. The annulus space is filled with a fluid comprising a non-compressible liquid. A differential pressure control mechanism maintains a differential pressure across the inner liner within a predetermined differential pressure range. The control mechanism can include a high pressure pump configured to recirculate the annulus fluid, a relief valve, and one or more pressure sensors. The storage module may be incorporated into a storage pod with a plurality of storage modules having a combined storage space and a combined annulus space. The storage modules may be suspended by a support plate into a subsurface well bore.

20 Claims, 18 Drawing Sheets

Related U.S. Application Data

(60) Provisional application No. 63/468,558, filed on May 24, 2023.

(52) U.S. Cl.
CPC .. *F17C 2221/033* (2013.01); *F17C 2223/035* (2013.01); *F17C 2265/065* (2013.01)

(56) References Cited

U.S. PATENT DOCUMENTS

| | | | |
|---|---|---|---|
| 3,196,622 | A | 7/1965 | Smith |
| 3,196,952 | A | 7/1965 | Solum |
| 3,205,665 | A | 9/1965 | Van Horn |
| 3,329,447 | A | 7/1967 | Hitz |
| 3,352,116 | A | 11/1967 | Waterman |
| 4,417,829 | A | 11/1983 | Berezoutzky |
| 4,639,164 | A | 1/1987 | Pugnale et al. |
| 4,676,528 | A | 6/1987 | Gray |
| 4,805,445 | A | 2/1989 | Grappe |
| 4,805,674 | A | 2/1989 | Knowlton |
| 4,852,054 | A | 7/1989 | Mastandrea |
| 5,207,530 | A | 5/1993 | Brooks et al. |
| 5,333,465 | A | 8/1994 | McBride |
| 5,577,862 | A | 11/1996 | Christensen et al. |
| 6,209,638 | B1 | 4/2001 | Mikolajczyk |
| 6,637,976 | B2 | 10/2003 | Stanton |
| 6,840,709 | B2 | 1/2005 | Dahlem et al. |
| 9,109,751 | B2 | 8/2015 | Schimp |
| 9,127,812 | B2 | 9/2015 | Ronchieri et al. |
| 9,562,646 | B2 | 2/2017 | Wang et al. |
| 9,896,269 | B2 | 2/2018 | Williams et al. |
| 10,002,683 | B2 | 6/2018 | Muller et al. |
| 10,337,669 | B2 | 7/2019 | Mercer et al. |
| 10,837,601 | B2 | 11/2020 | Mercer et al. |
| 10,995,906 | B1 | 5/2021 | Meheen et al. |
| 11,414,273 | B2 | 8/2022 | Bilak et al. |
| 2008/0131258 | A1 | 6/2008 | Liepold et al. |
| 2011/0274492 | A1 | 11/2011 | Verma et al. |
| 2012/0104008 | A1 | 5/2012 | DeNardo et al. |
| 2013/0336721 | A1 | 12/2013 | McBride et al. |
| 2014/0161533 | A1 | 6/2014 | Oates |
| 2015/0330569 | A1 | 11/2015 | Fitzpatrick |
| 2017/0314362 | A1 | 11/2017 | Mercer et al. |
| 2019/0106316 | A1 | 4/2019 | Van Vliet et al. |
| 2020/0132250 | A1 | 4/2020 | Mercer et al. |
| 2022/0333743 | A1 | 10/2022 | Mercer et al. |

FOREIGN PATENT DOCUMENTS

| | | | | | |
|---|---|---|---|---|---|
| KR | 200315889 | Y1 * | 6/2003 | .............. | F17C 13/04 |
| WO | 2023209079 | A1 | 11/2023 | | |
| WO | 2024007048 | A1 | 11/2024 | | |

* cited by examiner

SUBSURFACE GAS STORAGE SYSTEM

RELATED APPLICATIONS

The present application is a continuation-in-part (CIP) of U.S. patent application Ser. No. 18/125,567 filed Mar. 23, 2023, which is a CIP of co-pending U.S. patent application Ser. No. 18/119,649 filed Mar. 9, 2023, which in turn is a divisional of co-pending U.S. patent application Ser. No. 17/301,871 filed Apr. 16, 2021, now issued as U.S. Pat. No. 11,680,684. The present application also makes a claim of domestic priority to U.S. Provisional Patent Application No. 63/468,558 filed May 24, 2023. The contents of each of these applications are hereby incorporated by reference.

SUMMARY

Various embodiments are generally directed to a subsurface storage system configured to store a volume of gas at high pressure such as, but not limited to, hydrogen or compressed natural gas.

Without limitation, some embodiments provide a storage module with a rigid outer casing which surrounds a rigid inner liner to define a sealed interior gas storage space within the inner liner and a sealed annulus space between the inner liner and the outer casing. The annulus space is filled with a fluid comprising a non-compressible liquid. A differential pressure control mechanism maintains a differential pressure across the inner liner within a predetermined differential pressure range. The control mechanism can include a high pressure pump configured to recirculate the annulus fluid, a relief valve, and one or more pressure sensors. The storage module may be incorporated into a storage pod with a plurality of storage modules having a combined storage space and a combined annulus space. The storage modules may be suspended by a support plate into a subsurface well bore.

These and other features and advantages of various embodiments can be understood from a review of the following detailed description in conjunction with a review of the accompanying drawings.

DETAILED DESCRIPTION

Various embodiments of the present disclosure are generally directed to the subsurface storage of compressed gas. The stored gases can take a variety of forms such as hydrogen, methane, natural gas, propane, and other combustible gases that may be utilized as a fuel. Other stored gases can include reactive gases such as compressed air, chlorine based gases, etc., inert gases such as helium, neon, etc., and so on.

The volume of gases consumed for personal, commercial, and industrial purposes has increased over time and appears to continue to grow. The storage of fluids and some gases can be safely facilitated with a variety of storage materials and configurations, such as metals, ceramics, stone, and polymers. However, the storage of relatively small gas molecules poses a difficult challenge for short-term, and long-term, time periods as leaks and/or gas permeation can occur despite the presence of materials and seals that effectively store large molecule gases. The presence of pressure can further exacerbate the difficulties of storing small molecule gas due to the molecular construction of storage tanks, containers, and seals.

With these issues in mind, an adapter constructed and utilized in accordance with various embodiments can safely store small molecule gas in a tank/container under dynamic pressure over extended periods of time. The use of an adapter that safely stores small molecular gasses allows a tank/container that is suitable for storing large molecule gases to store gasses of nearly any molecular size. Efficient installation and utilization of a tank/container adapter to store gases with small molecule sizes under pressure allows older generation large molecule gas storage to be repurposed with minimal labor, time, and cost.

Figure 1:
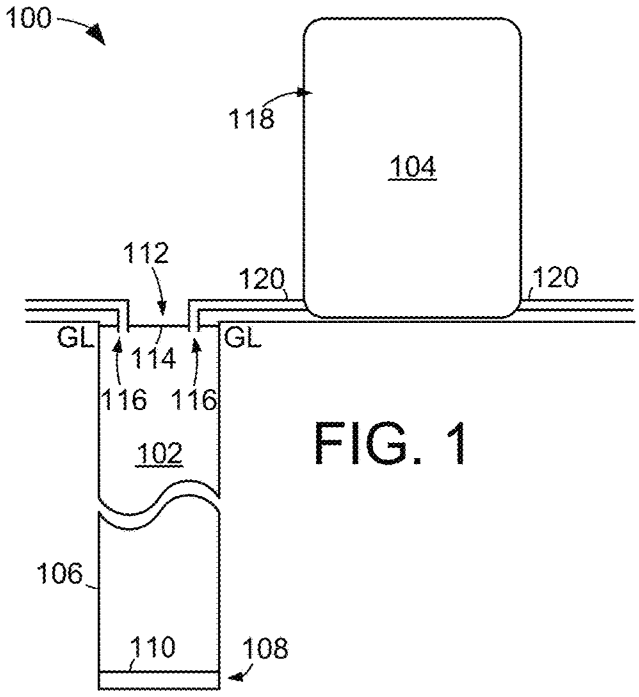
FIG. 1 represents portions of an example gas storage system in which various embodiments may be practiced.

FIG. 1 depicts portions of an example gas storage system 100 arranged with a subsurface (subterranean) gas storage container 102 and a gas storage tank 104. It is noted that a subsurface container describes a container that is operationally positioned partially, or completely, below a ground level (GL). As shown, the gas storage container 102 is arranged to be wholly underground and continuously extending to a depth (D) into one or more formations or layers below ground level.

The gas storage container 102, also sometimes referred to herein as a storage module, comprises at least one rigid outer casing 106 that is sealed on the bottom 108 by a plug 110 and on the top 112 by a cap assembly 114. It is contemplated that multiple lengths of separate casing 106 may be joined together to form the gas storage container 102 and extend to the predetermined depth, such as 50 feet or more, to allow gas storage under static, or dynamic, pressure, such as greater than 100 pounds per square inch (psi). The gas storage container 102 can have one or more ports 116 that allow piping/tubing to move gas into, and out of, the casing 106.

The gas storage tank 104 may be constructed of any type, number, and size of materials that form a sealed volume 118 accessed by gas transmission lines 120 to allow ingress, pressurization, and egress of various volumes of gas over time. Although the container 102 and tank 104 are not displayed with gauges, valves, and safety relief equipment, it is contemplated that the respective components 102/104 can be configured with one or more gas regulating, controlling, moving, pressurizing, and/or safety equipment. It is noted that the movement, pressurization, and storage of gas in the respective components 102/104 can be initiated, terminated, and controlled by one or more users positioned on site, which can be characterized as physically present with the components 102/104, or off site, which can be characterized as connected to the respective components 102/104 electronically.

Figure 2:
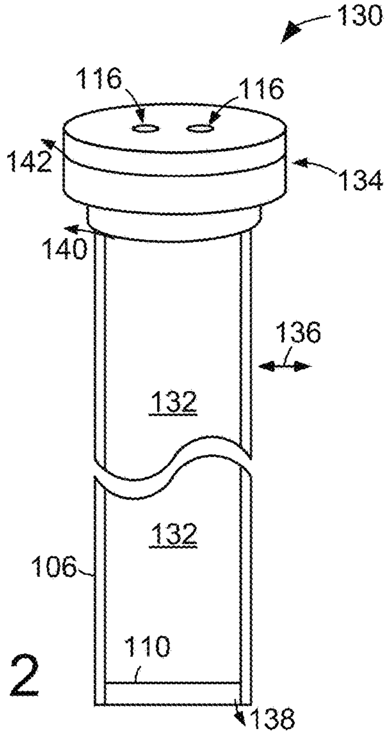
FIG. 2 depicts a line representation of portions of an example gas storage container arranged in accordance with some embodiments.

FIG. 2 depicts a line representation of portions of another example gas storage container 130 that may be used as part of a gas storage system in combination with one or more other gas storage components. The gas storage container 130 defines a storage volume 132 defined by the interior, sealed aspect of the casing 106. A bottom plug 110, or bottom cap assembly 134, can establish a bottom container extent while a top cap structure 136 establishes a top container extent that provides gas 20 transmission and pressurization.

While the materials and sealing components outlined in FIG. 2 are fully capable of storing conventional gases as well as small molecule gases, permeation into the materials by small molecule gases, such as hydrogen, will accelerate fatigue through embrittlement and significantly shorten the service life of the storage. If embrittlement due to the storage of small molecule gas under pressure, such as above 1,000 psi, degrades the competency of the container 130 to the point of catastrophic failure, the release gas from a container 130 or from one or more locations about a container 130 can pose a serious hazard, particularly when flammable gases are being stored.

Figure 3:
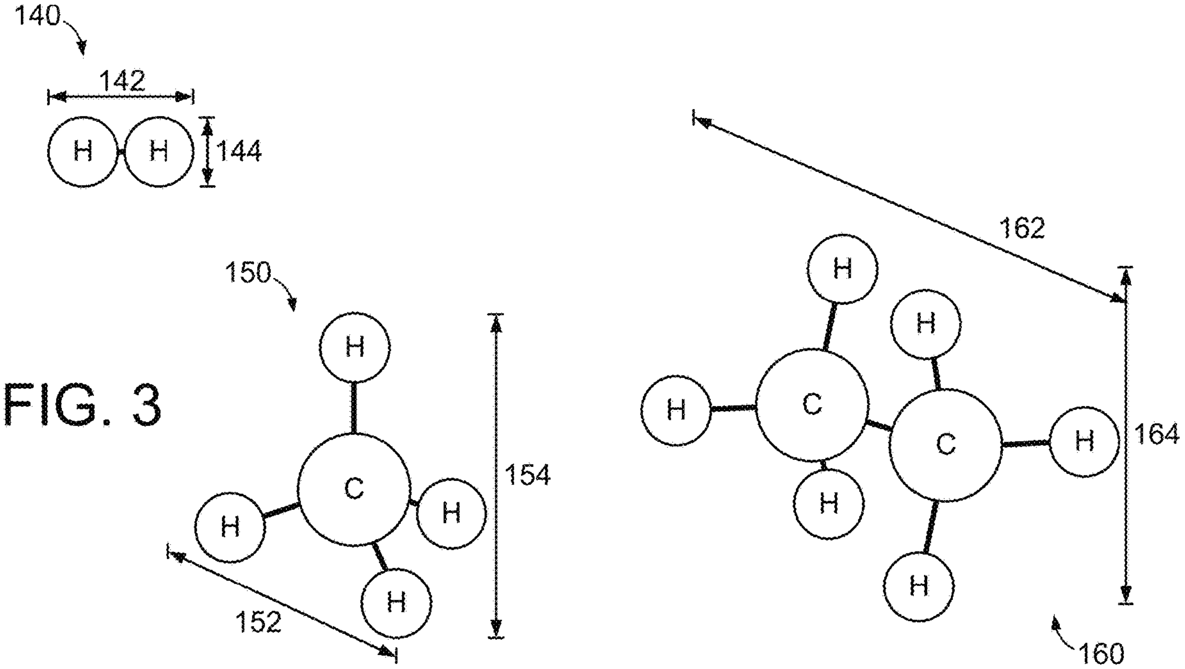
FIG. 3 conveys a line representation of gas molecules that may be stored in the gas storage system in accordance with assorted embodiments.

FIG. 3 displays molecular diagrams of assorted gases that can be stored in a gas storage container. An example molecule is $H_2$ 140, which has an atomic size and molecular configuration that is relatively small compared to other gases, such as methane 150 and ethane 160. Specifically, $H_2$ 140 has a length 142 and width 144 that defines a molecular area that is significantly smaller than the molecular area of methane 150, as defined by width 152 and height 154 measurements, or ethane 160, as defined by width 162 and height 164 measurements. While not drawn to scale, the molecules of FIG. 3 generally illustrate how storage of $H_2$ 140 can be more difficult than methane 150, ethane 160, or other natural gas hydrocarbons due to the relatively small size, particularly with regard to the material porosity of many gas storage casings, such as lead, steel, and iron.

Accordingly, various embodiments utilize an adapter to allow a typical casing 106, such as an oil well casing constructed of carbon steel or other steel alloys to be used to safely and reliably store gas with a relatively small molecular size, such as $H_2$.

Figure 4A:
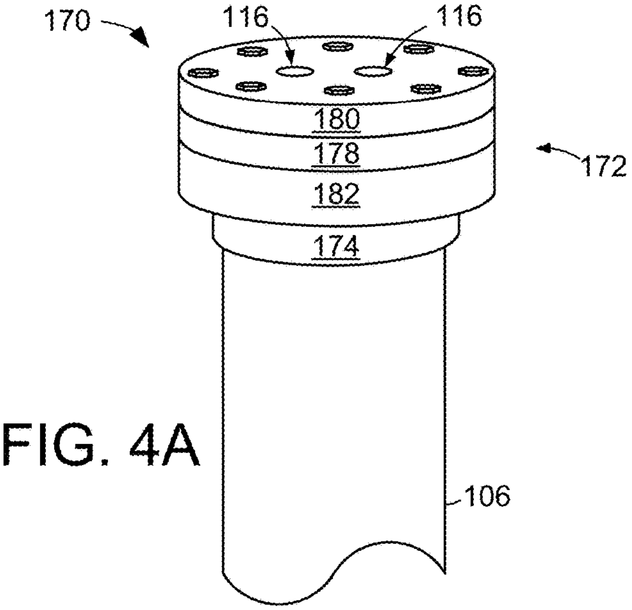
FIGS. 4A-4C respectively illustrate portions of an example gas storage assembly that can be utilized in accordance with various embodiments.
Figure 4B:
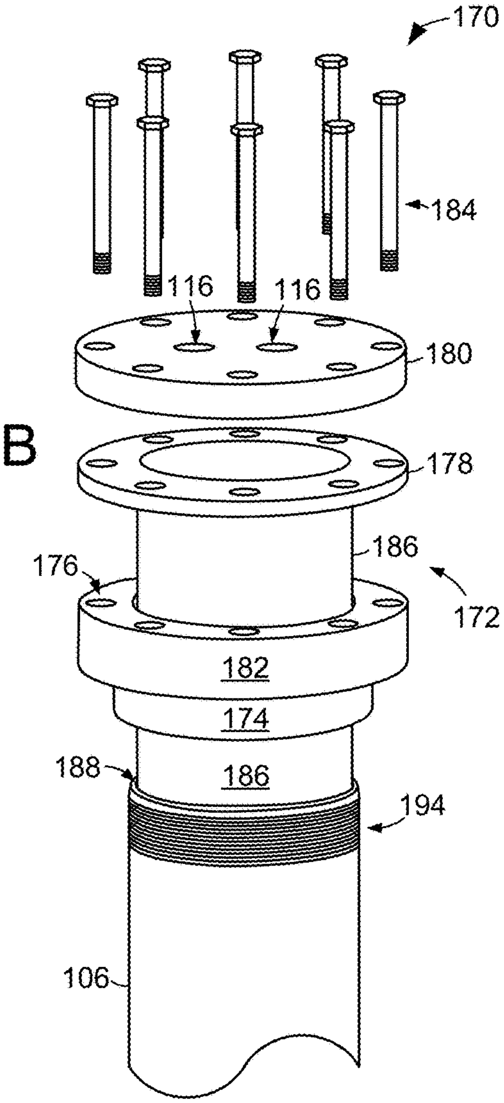
Figure 4C:
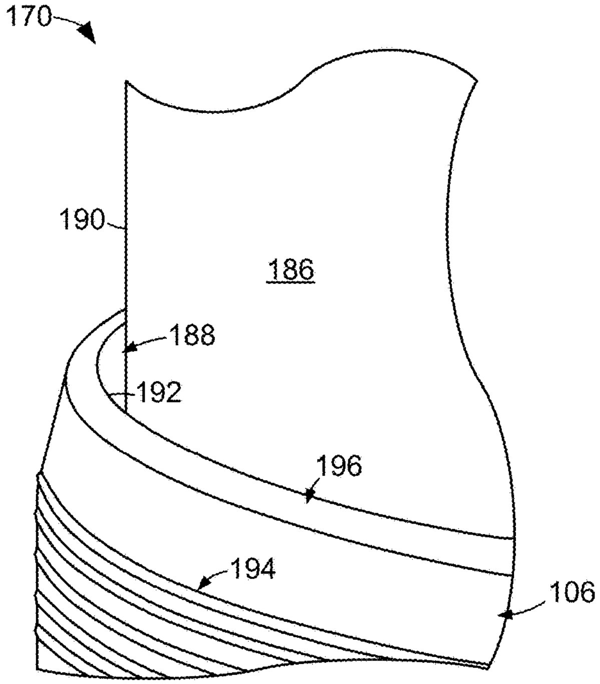

FIGS. 4A-4C respectively depict line representations of portions of an example gas storage container 170 configured and operated to store small molecule gas at relatively high pressures, such as over 1000 psi. The container utilizes a casing 106 that defines an interior volume along with a bottom plug or cap (not shown) and a top cap structure 172. The cap structure 172, in some embodiments, has a collar 174 that attaches to the casing 106 and presents a fastening surface 176 (FIG. 4B) for an adapter flange 178 and lid 180.

FIG. 4A illustrates how the cap structure 172 fits together, once assembled, with the adapter flange 178 sandwiched between an upper portion 182 of the collar 174 and the lid 180 (also sometimes referred to as an upper member or top member). The enlarged size of the upper portion 182 allows one or more fasteners 184 to extend through the cap structure 174 to form a gas tight assembly that is accessed via one or more ports 116.

The exploded view of FIG. 4B illustrates how the adapter flange 178 is connected to an adapter barrel 186 that defines an internal volume that is less than the volume of the outer casing 106. It is contemplated that the adapter barrel has a solid bottom that forms a water tight and air tight receptacle without installation of a plug, cap, lid, or cover onto the bottom of the barrel 186, opposite the flange 178. For reference, the outer casing 106 is also sometimes referred to as an outer liner, and the adapter barrel 186 is also sometimes referred to as an inner liner. The inner and outer liners are both formed of rigid materials and respectively define an interior gas storage space within an interior of the inner liner and an outer annulus space between the inner and outer liners.

While not limiting, various embodiments construct the adapter flange 178 and barrel 186 of forged, cast, machined, or assembled material, such as aluminum, which exhibits low permeability to small molecules, such as $H_2$ and high resistance to embrittlement, which extends the life of the adapter. It is contemplated that some, or all, of the adapter 178/186 can be coated with one or more materials to lower gas permeability even more and/or increase rigidity, corrosion resistance, and fatigue resistance. Some embodiments coat different aluminum adapters with a polymer, rubber, ceramic, or graphene material to allow a casing 106 to employ an uncoated adapter or one of various adapters that exhibit different operational characteristics due to the respective coatings.

The adapter 178/186 is configured for installation into a casing 106 without adjusting or removing the casing 106 from its position, whether partially or completely underground. It is contemplated that the adapter 178/186 can be utilized in above ground gas storage tanks. The size and shape of the adapter barrel 186 relative to the casing 106 produces an annulus 188 of empty space extending between the casing 106 and barrel 186 along the entirety of the barrel sidewalls 190 (FIG. 4C). That is, an annulus 188 can be measured as the distance from an interior sidewall 192 of the casing 106 to a barrel sidewall 190. The annulus 188 allows the adapter barrel 186 to be installed, and removed, from the casing 106 without damaging the adapter barrel 186 and provides space for a damping material to be placed between the casing 106 and barrel 186.

In the close-up line representation of the annulus 188 in FIG. 4C, the threads 194 of the casing 106 are shown, which interact with matching threads of the collar 174 to mate a casing sealing surface 194 with the collar 174 via a metal-to-metal connection. In other words, the casing 106 is configured with threads 194 that flow into a tapered surface 196 that defines a sealing surface 196 that is brought into contact with the collar 174 to form a gas tight seal. While one or more sealing materials can be introduced between the collar 174 and casing 106, assorted embodiments machine the collar 174 and casing sealing surface 194 to tolerances that provide a gas and/or fluid tight seal strictly with a metal-to-metal connection.

Figure 5:
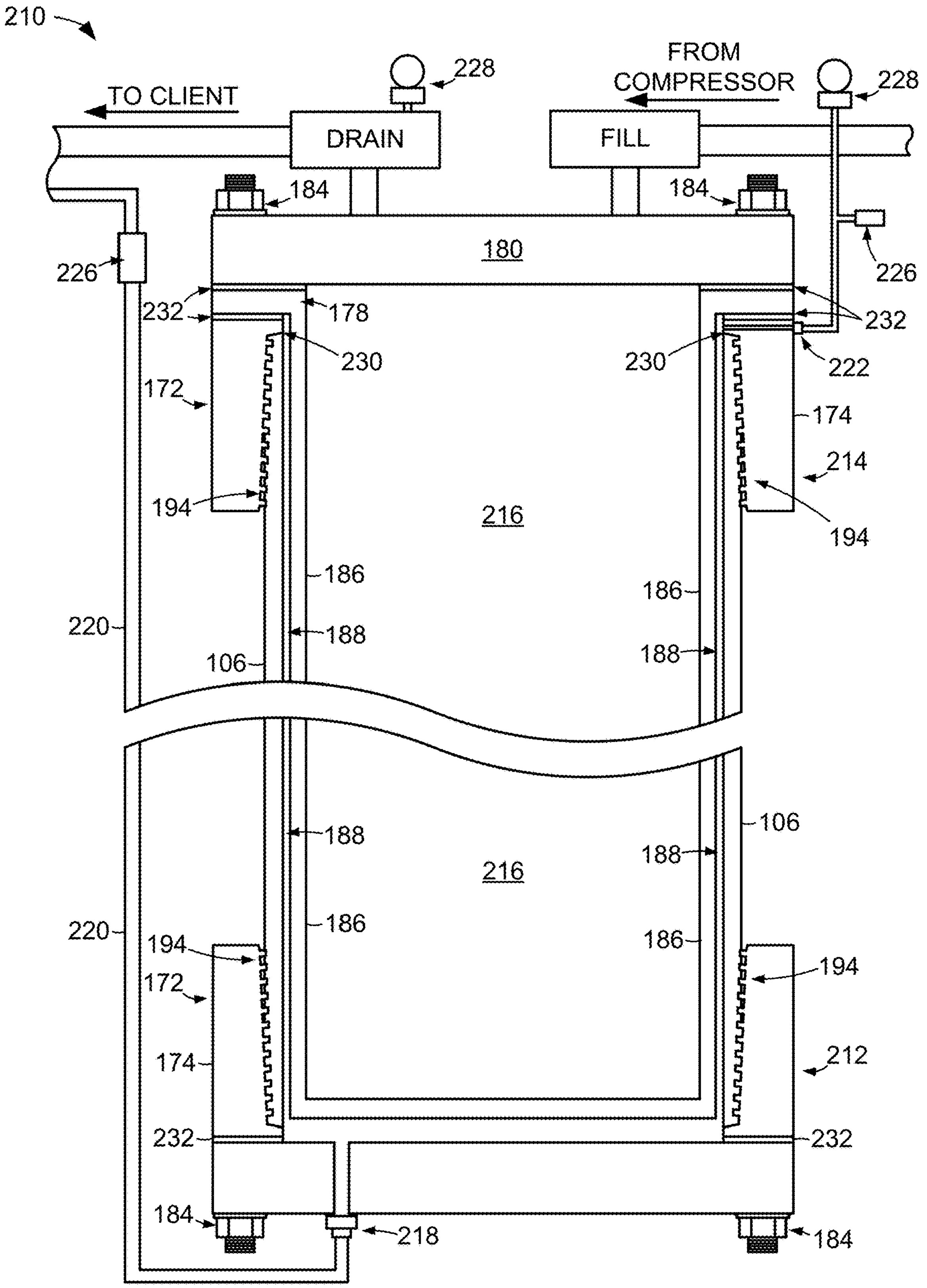
FIG. 5 depicts portions of another example gas storage assembly configured and operated in accordance with some embodiments.

FIG. 5 depicts a cross-sectional line representation of portions of an example gas storage container 210 arranged in accordance with various embodiments. The container 210 employs a casing 106 with first threads 194 positioned to secure a bottom cap 212 to a first region while second threads 194 secure a top cap 214 to a second region. It is noted that some embodiments utilize one or more plugs to seal a bottom of the casing 106 while other embodiments employ matching cap structures 212/214 that thread a collar onto the casing 106 and secure a lid onto the collar via fasteners, as illustrated in FIGS. 4A-4C.

Although the cap structures 212/214 may having matching configurations, the cap structure 212/214 located at the top portion of the casing 106 secures the adapter flange 178 between the collar 174 and lid 180 to ensure the adapter 178/186 does not inadvertently move or get ejected from the casing 106. The secure position of the adapter 178/186 defines the annulus 188. While the annulus 188 may be kept empty, or in a vacuum pressure differential, the cyclic filling and removing of gas within the adapter internal volume 216 can cause at least the adapter barrel 186 to expand and contract. Such barrel 186 movement can cause fatigue to the barrel 186 material as well as damage to the sidewalls of the casing 106 and/or barrel 186. Hence, some embodiments fill the annulus 188 with damping that reduces the expansion and contraction of the barrel 186 material in response to pressurization and depressurization of the internal volume 216.

The annulus 188, in various embodiments, is filled with propylene glycol (C3H8O2) and brought to a desired pressure. Although other fluids, and combinations of fluids, can be used to fill the annulus 188, propylene glycol has an extremely low freezing point, low compressibility, and is compatible with corrosion inhibitors while being environmentally friendly and non-toxic. As the annulus 188 presents a finite and relatively uncompressible volume of glycol, pressure exerted on the barrel 186 is transferred to the outer casing 106 with minimal expansion of the barrel 186. As a result, fatigue and physical damage to the barrel 186 due to expansion and contraction of cyclic pressurizations are managed to meet, or exceed, the rate of deterioration due to embrittlement over time. The adapter and lid 180, in some embodiments, are sacrificial and are replaced according to a predetermined schedule that maintains a margin of safety for the container and extends the service life of the outer casing 106 and cap assemblies indefinitely.

While the adapter barrel 186 fits inside the casing 106, the vacuum pressure of the annulus 188 and bottom of the casing 106 can make removal difficult. To accommodate a more efficient removal, the annulus 188 is plumbed to one or more fill ports 218 that can be positioned in a bottom cap structure 172, as shown, or other locations that provide access to the annulus 188 from outside the casing 106. It is noted that positioning the fill port 218 at the bottom-most extent of the annulus 188, casing 106, and container 210 allows the annulus to be efficiently filled and drained with liquid, as opposed to a side positioned port that would potentially not drain some annulus liquid without high pressure. The annulus fill port 218 is connected to at least one feed line 220 that allows for the ingress, egress, and pressurization of the gas/fluid with respect to the annulus 188.

The annulus fill port 218 can be complemented by one or more annulus monitor port 222 that may be positioned anywhere on the casing 106, but in some embodiments extends through a top collar 174, as shown in FIG. 5. A bleed line 224 allows pressure, gas, and/or fluid to be released upon selection of a valve 226. The bleed line 224 further allows one or more gauges 228 to monitor conditions of the annulus 188, such as pressure, humidity, and temperature. Use of one or more ports 218/222 that access the annulus 188 allows the adapter 178/186 to be hydraulically pumped into position within the casing 106, which alleviates difficulties associated with purely mechanical, or pneumatic, adapter 178/186 installation.

For instance, incompressible fluid can be pumped into, and out of, the annulus 188 to draw the adapter 178/186 into, or out of, the casing 106. As a result, the annulus 188 can be used to aid adapter 178/186 installation and removal, which allows for different adapters 178/186 to be utilized for a container 210 over time to accommodate different gas storage conditions and capabilities. The monitoring of one or more annulus ports 218/222 provides data that can be used to determine the real-time current annulus gas/fluid condition. That is, pressure, and other environmental conditions in the annulus 188, can be tracked over time to calculate at least the volume, compressibility, density, and relative pressure of the gas/fluid in the annulus 188. Such annulus 188 conditions can be used to schedule proactive and/or reactive maintenance that serves to maintain the annulus 188 so that charging and discharging of gas in the adapter internal volume 216 does not induce more than minimal fatigue, corrosion, and mechanical war on the adapter 178/186.

Some embodiments utilize only metal-to-metal seals to create a gas, or fluid, tight enclosure with the container 210, as conveyed in FIG. 4C and shown by the casing/collar interactions 230 of FIG. 5. Other embodiments can complement metal-to-metal seals of the casing/collar with one or more metal or non-metal gaskets 232, such as cork, rubber, polymer, ceramic, and synthetic materials capable of sealing at working pressures. The use of one or more gaskets 232 in a cap structure 172 can be changed over time and allow the container 210 to provide optimal small molecule gas storage over a diverse range of temperatures and pressures.

Figure 6:
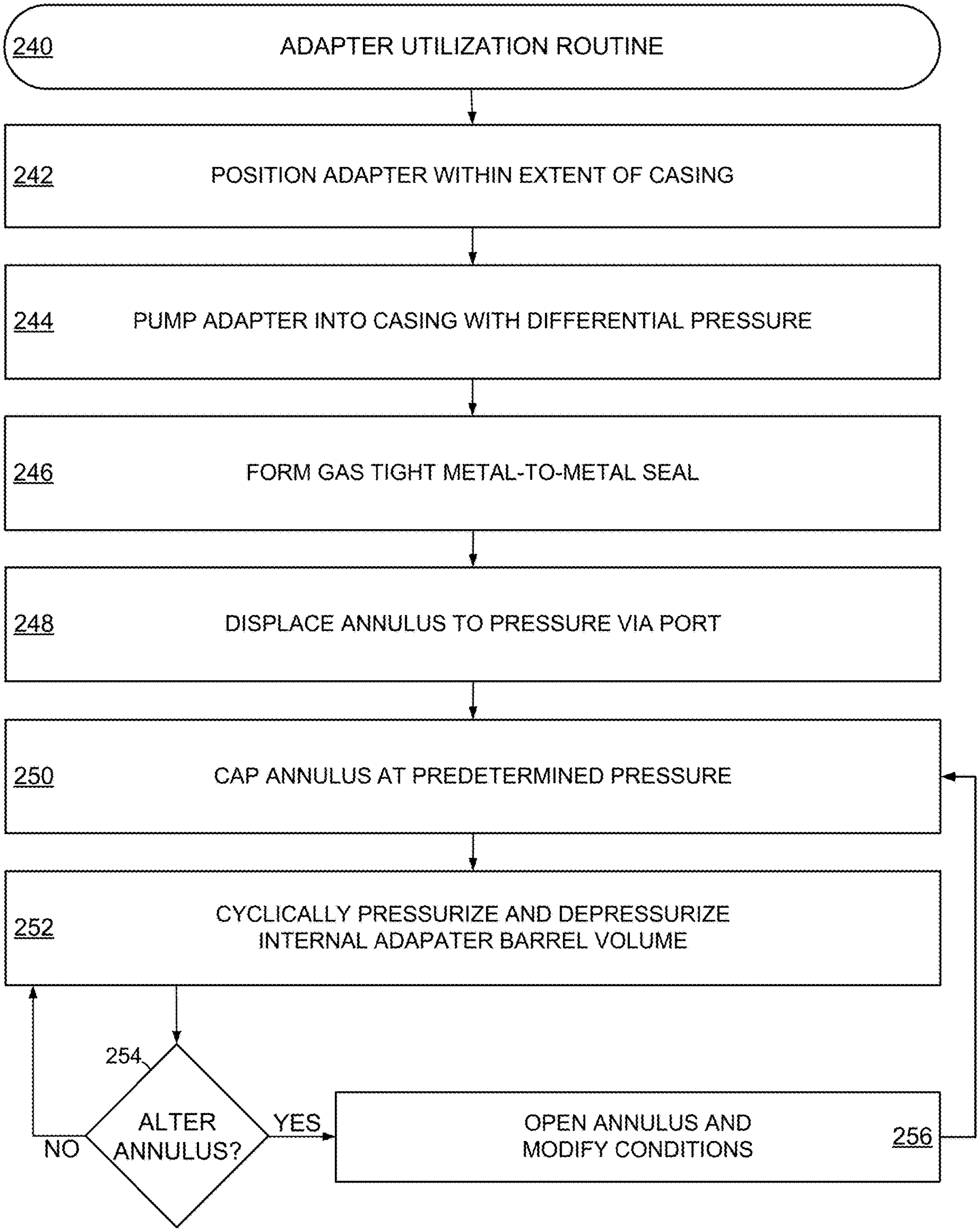
FIG. 6 is an example gas storage assembly installation routine that can be executed with the various embodiments of FIGS. 1-5.

FIG. 6 conveys a flowchart of an example adapter utilization routine 240 that can be executed with assorted embodiments of FIGS. 1-5 to provide gas storage for gases that have relatively small molecular size. The presence of a hollow, unfilled casing allows step 242 to begin the process of installing a single small molecule adapter into the casing. It is contemplated that the casing is constructed of a material, such as steel alloy, iron, or lead, that is not conducive to small molecule gas storage due to susceptibility to embrittlement. As such, the adapter can be constructed of a dissimilar material than the casing, such as aluminum, ceramics, and nanocomposites, that provides superior resistance to embrittlement than the casing.

Once the storage volume is depressurized and the lid 180 of the cap assembly is removed, the adapter is positioned over the hollow casing in step 242. Insertion of the adapter begins in step 244 and can involve using suction on the annular fill line 220 to pull the adapter into the casing until an adapter flange 178 contacts a cap structure collar 174, as illustrated in FIGS. 4A & 5. Once the adapter flange 178 is seated on the structure collar 174, the lid 180 is secured in place, which seals both the annulus 188 and the interior volume 216 of the adapter while isolating the annulus 188 from the interior volume 216.

The metal-to-metal seal may be complemented by one or more gaskets 232 positioned between the adapter flange, collar, and lid, The gas tight seal 230 and the gasket 232 between the collar 174 and the adapter flange 178 seal the annulus 188. The gasket 232 between the lid 180 and the adapter flange 178 seals the small molecule gas within the volume of the adapter 216 at pressures over 1000 psi.

With the annulus formed after the top cap structure has been assembled and secured so that the adapter flange is locked in place along with the adapter barrel, the volume of the annulus is displaced in step 248 by pumping a fluid or gas with low compressibility, such as propylene glycol down the annular fill line 220 and venting the volume of the annulus out the annular bleed valve 226. Once displaced, the bleed valve 226 is closed and the annulus is pressurized to a predetermined relative pressure, such as 10 psi, and the annulus drain/fill port is closed in step 250 and the annulus has a static condition until the adapter barrel expands and contracts to induce force and/or pressure on the annulus. It is noted that while the annulus drain/fill port remains closed during gas storage operations within the adapter barrel, the annulus monitor port can remain open to one or more gauges or be selectively opened with valving to allow at least annulus pressure to be detected.

Next, step 252 cyclically fills the internal chamber of the container, as defined by the adapter barrel, to a predetermined pressure and volume of gas before depressurizing the internal chamber as pressurized gas is released from the container. It is contemplated that the internal chamber is pressurized to a common pressure cyclically in step 252 or dynamic pressures are utilized over time depending on environmental conditions and/or desired amount of gas to be stored. Step 252 may be conducted for any amount of time with any number of gas fills/drains being conducted and associated with the internal chamber of the adapter barrel being pressurized and depressurized.

At any time, a user/operator of the container can evaluate in decision 254 to alter the annulus. If an annulus modification is in order, such as in response to a change in pressure of the annulus or a desire for a different compressibility value for the annulus, step 256 opens the annulus drain/fill port 220 and displaces the volume of the annulus out the bleed valve, which replaces the damping material of the annulus and repressurizing the annulus to different operating conditions. Some embodiments of step 256 simply fill and/or repressurize the annulus without displacing the annulus with new damping material/fluid. At the conclusion of the modification(s) to the annulus in step 256, the annulus is capped by returning to step 250.

In the event no annulus alteration is necessary from decision 254, the routine 240 returns to step 252 and the cyclical use of the internal chamber of the adapter barrel for the storage, and dispensing, of gas at a predetermined pressure, such as above 1000 psi. Through the use of the monitored and controlled annulus, along with the resistance to embrittlement of the adapter barrel compared to the outer casing, gas can be reliably stored and dispensed over time without material fatigue, corrosion, and leakage. The ability to interchange adapter barrels without modifying or moving an outer casing extends the service life of the container and allows for efficient alteration of the gas storage capabilities and performance of a gas storage container with minimal equipment and manpower.

Figure 7:
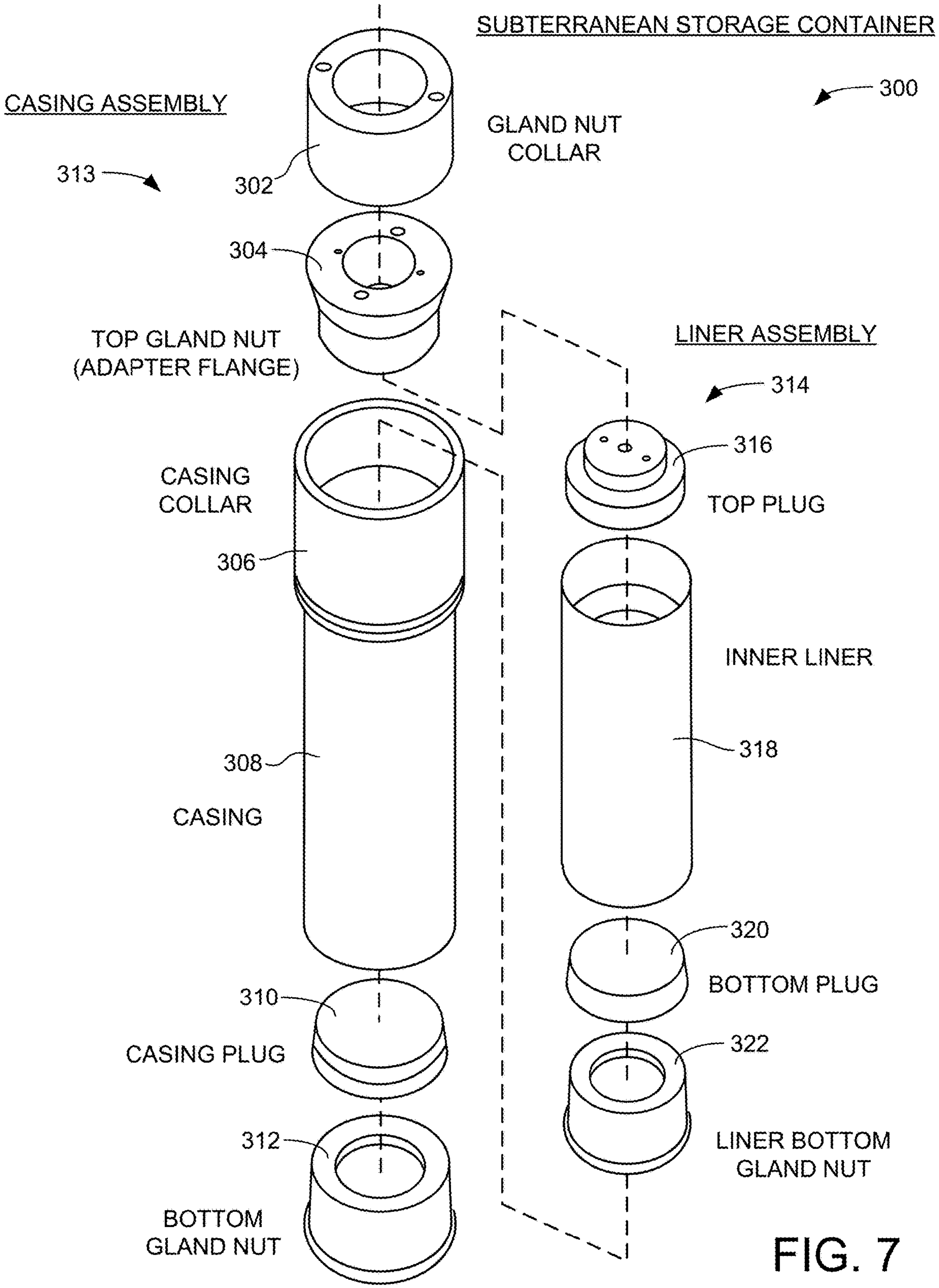
FIG. 7 is an exploded view representation of another gas storage system constructed and operated in accordance with further embodiments.

FIG. 7 provides an exploded-view representation of another gas storage container (module) 300 constructed and operated in accordance with further embodiments. The container 300 is similar to the embodiments discussed above and may be constructed and operated using similar principles as those described above. While not limiting, the storage container 300 is contemplated as being configured to extend underground (e.g., from adjacent a surface level and into a subsurface formation) and is adapted to store a quantity of high pressure gas. In the present example, the gas is hydrogen at a selected pressure such as upwards of around 12,000 psi or more.

Various features have been omitted from the simplified, exploded view of FIG. 7 for purposes of clarity of illustration. The elements include a top member 302, also referred to as a gland nut collar; an adapter flange 304, also referred to as a top gland nut; a casing collar 306; an outer casing 308; a lower casing plug 310, and a bottom cover 312, also referred to as a bottom gland nut or bottom casing cover/flange. These elements, when combined, form an outer casing assembly 313.

An inner liner assembly 314 is adapted for insertion and alignment within the outer casing assembly 313. The liner assembly 314 includes a top liner plug 316; an inner liner 318; a bottom liner plug 320; and a liner bottom cover 322, also referred to as a liner bottom gland nut or bottom flange. Those skilled in the art will recognize that gland nuts such as depicted at 304, 312 and 322 can be characterized as threaded flanges to form mechanical interconnections with desired sealing interfaces, which will now be discussed with reference to FIG. 8.

Figure 8:
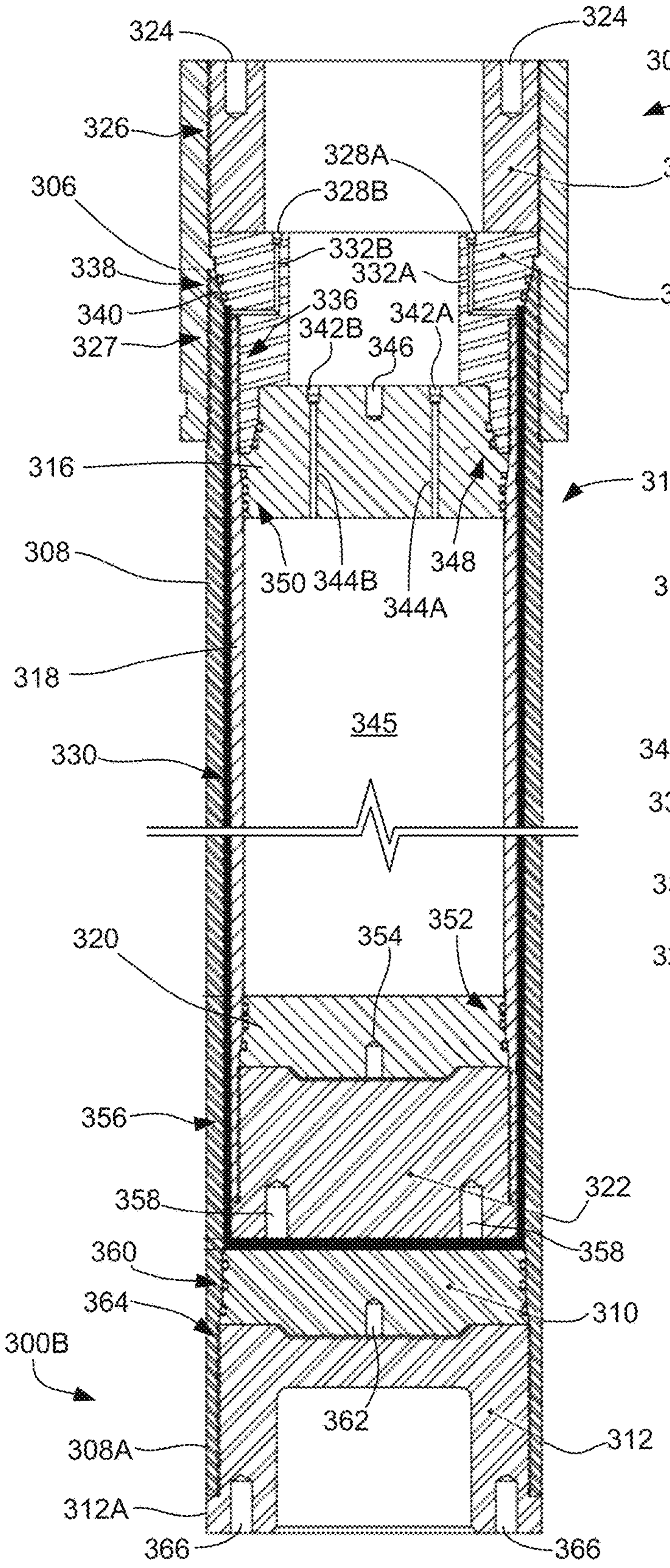
FIG. 8 is a cross-sectional depiction of the gas storage system of FIG. 7.

FIG. 8 is a cross-sectional, elevational depiction of the container 300 from FIG. 7 in some embodiments. The various main elements 302 through 322 are shown. It will be noted that other configurations can be used, so that the arrangement depicted in FIGS. 7-8 is merely exemplary and is not limiting. For example, different sizes, shapes, interfaces and numbers of elements can be utilized while still practicing the claimed invention as set forth below.

Nevertheless, for ease of illustration it is noted that the embodiment as shown in FIGS. 7-8 has ten (10) main elements; two (2) elongated, hollow and substantially cylindrical liners (e.g., the outer casing 308 and the inner liner 318); four (4) top elements, namely the gland nut collar 302, top gland nut 304, casing collar 306 and the top liner plug 316; and four (4) bottom elements, namely the casing plug 310, the bottom gland nut 312, the bottom liner plug 320 and the liner bottom gland nut 322. The elements at the top portion of the container 300 are sometimes referred to an upper sealing assembly 300A, and the elements at the bottom portion of the container are sometimes referred to as a lower sealing assembly 300B. As before, the inner and outer liners are both formed of one or more rigid materials, with the interior of the inner liner defining a gas storage space and an annulus space formed between the inner and outer liners.

While not limiting, a notable aspect of the configuration of FIGS. 7-8 is that the lower sealing assembly is aligned with, and housed within the circumferential extent of, the outer surface of the casing 308. That is, an outer cylindrical surface 308A of the casing 308 nominally aligns with an outer cylindrical surface 312A of the casing bottom gland nut 312. This can provide a number of advantages such as smaller overall diameter, greater clearance distances, etc. Providing a lower sealing assembly that does not protrude beyond the outermost diameter of the casing also facilitates the raising and lowering of multiple containers into a larger grouping (pod) of containers (modules).

Various features of the container 300 will now be identified and discussed in turn, working downwardly beginning from the top of FIG. 8. The gland nut collar 302 includes a pair of threaded apertures 324 that extend downwardly through a top surface of the collar. While optional, these threaded apertures can receive threaded fasteners (not shown in FIG. 8) to provide a gripping mechanism to enable rotation of the collar 302 during installation as well as lifting and placement of the entire container 300.

Interlocking threads 326 extend along the outer surface of the gland nut collar 302 and an inner top surface of the casing collar 306. The threading engagement of the gland nut collar 302 with the casing collar 306 compresses a portion of the gland nut (adapter flange) 304 to provide a gas-tight seal. A similar set of threads is denoted at 327 to facilitate threading engagement of an inner lower surface portion of the casing collar 306 onto the outer surface 308A of the casing 308.

A top exposed portion of the gland nut 304 includes a pair of ports (openings) 328A and 328B. These ports are in fluidic communication with an annulus 330, which is similar to that described above in FIGS. 1-6 in that the annulus 330 extends between respective cylindrical outer side walls of the inner liner 318 and the outer casing 308, as well as between the liner gland nut 322 and the lower casing plug 310. In this way, the annulus fully surrounds the sides and the bottom of the liner. As before, a suitable non-hardening, incompressible liquid such as propylene glycol fills the annulus 330.

Interior conduits (passageways) 332A and 332B interconnect opposing sides of the annulus 330 with the ports 328A, 328B. While not limiting, in some cases port 328A can be used as a fill port for the liquid within the annulus 330 and port 328B can be used as a return or drain port for the liquid from the annulus. Bottom draining of the annulus 330 can also be provided as desired, but has been omitted from the embodiment of FIG. 8.

Figure 8A:
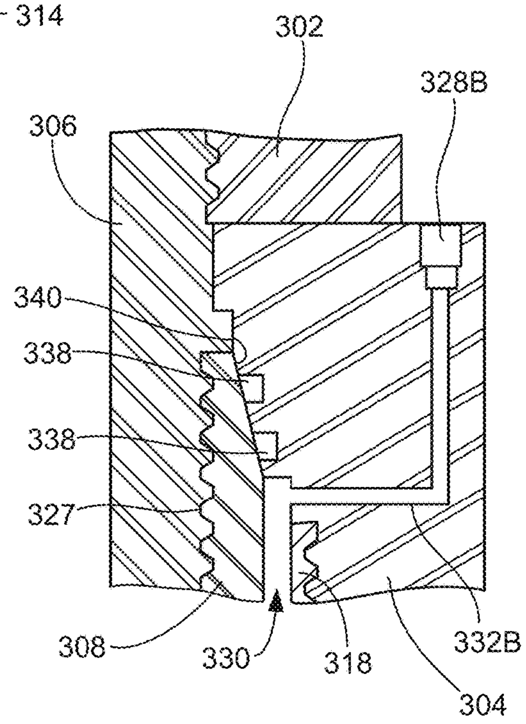
FIG. 8A shows aspects of FIG. 8 in greater detail.

A sealing interface between the gland nut 304 and an upper portion of the outer casing 308 is shown more fully in FIG. 8A to include a pair of spaced apart, annular sealing members 338 which bear against a tapered (frusto-conically extending) sealing surface 340. While not necessarily required, the use of tapered surfaces such as 340 has been found to enhance the sealing effectiveness of the various sealing junctions within the container 300. As used herein, it will be understood that the term "tapered" and the like will refer to a non-orthogonally extending sealing surface with respect to either the horizontal or vertical directions (e.g., x and y axes as shown).

The respective sealing members may take the general form of o-rings or similar annular members. The members may be formed of any number of suitable materials including an elastomeric polymer (e.g., nylon, rubber, plastic, etc.), metal, etc. It is contemplated that the seals will have low permeability to and be non-reactive with the stored gas. Embedded reinforcement material and/or outer coatings can be applied to the sealing members as required to further enhance sealing and reduce gas permeability.

Continuing with FIG. 8, the upper plug 316 further includes a pair of exposed ports 342A and 342B coupled to interior conduits 344A and 344B that extend downwardly through the upper plug to an interior storage space 345. The storage space 345 extends within the inner liner 318 to store the high pressure hydrogen or other stored gas. The ports 342A/342B and conduits 344A/344B can be configured to facilitate filling, drawing and purging of the stored gas from the interior storage space 345 as explained below. Different configurations can be used, including different numbers and locations of the ports and conduits.

A central threaded aperture 346 in the plug 316 is adapted to receive a threaded fastener (not shown) to enable the plug to be raised and lowered into place. Upper and lower sealing members 348, 350 provide gas-tight sealing between the plug 316 and the respective gland nut 304 and inner liner 318 in a manner similar to the sealing members 338 discussed in FIG. 8A.

The bottom liner plug 320 forms a portion of the lower sealing assembly 300B and includes annular sealing members 352 which bear against an interior surface of the liner 318. A threaded alignment aperture is shown at 354. The lower liner gland nut 322 threadingly engages a lower portion of the interior surface of the liner 318 via threads 356 and includes threaded alignment apertures 358. The bottom liner plug 320 and lower liner gland nut 322 thus seal off the lower portion of the interior sealing space 345.

The casing plug 310 has similar annular sealing members 360 which bear against the interior facing surface of the casing 308, and has a central threaded alignment aperture 362. The lower casing gland nut 312 engages threads 364 along the interior facing surface of the casing 308, and includes lower threaded alignment apertures 366. The casing plug 310 and lower casing gland nut 312 seal off the annulus 330 and the lower end of the casing 308.

Figure 9A:
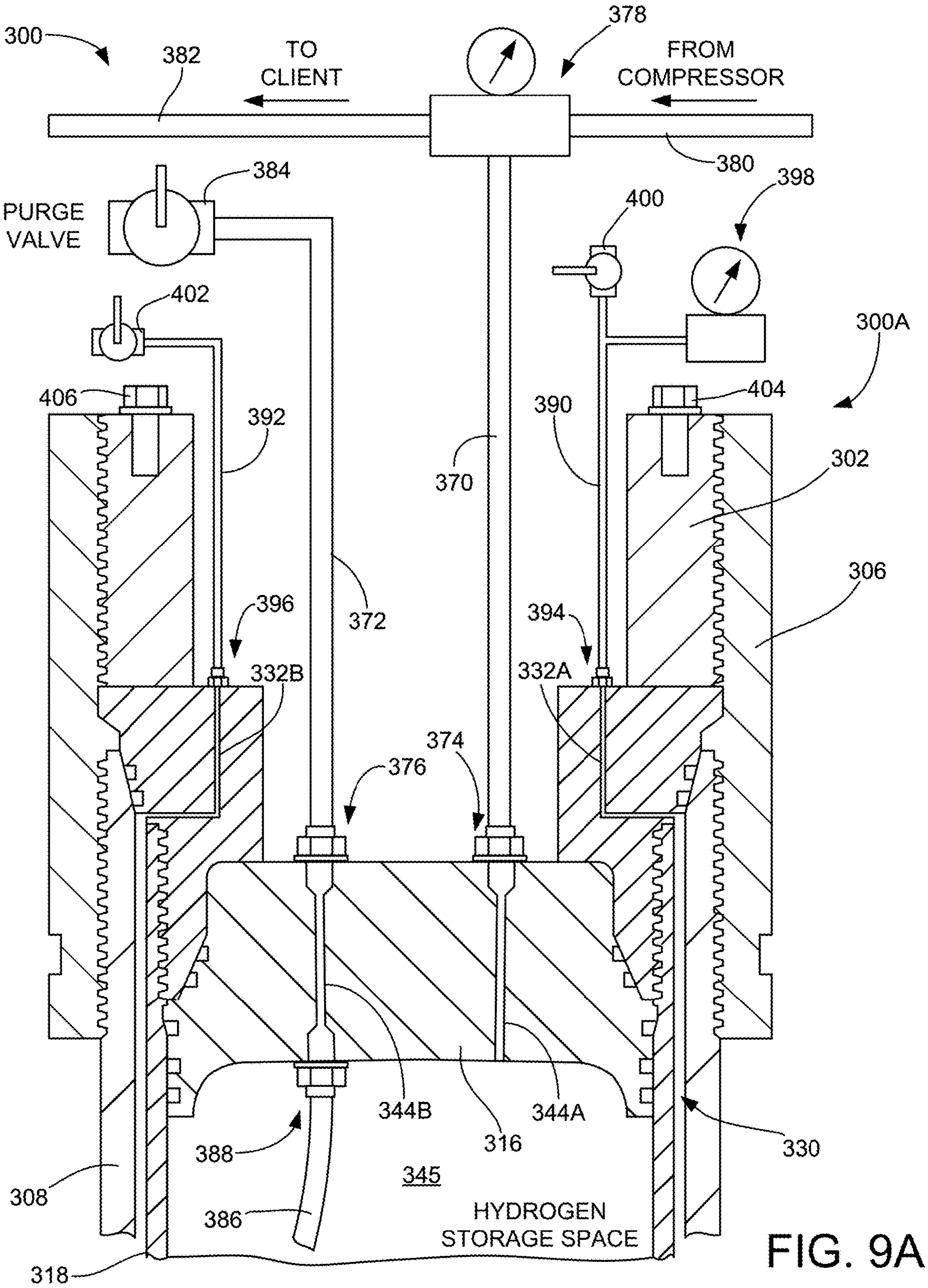
FIGS. 9A and 9B are additional cross-sectional depictions of upper and lower portions of the gas storage system in accordance with further embodiments.
Figure 9B:
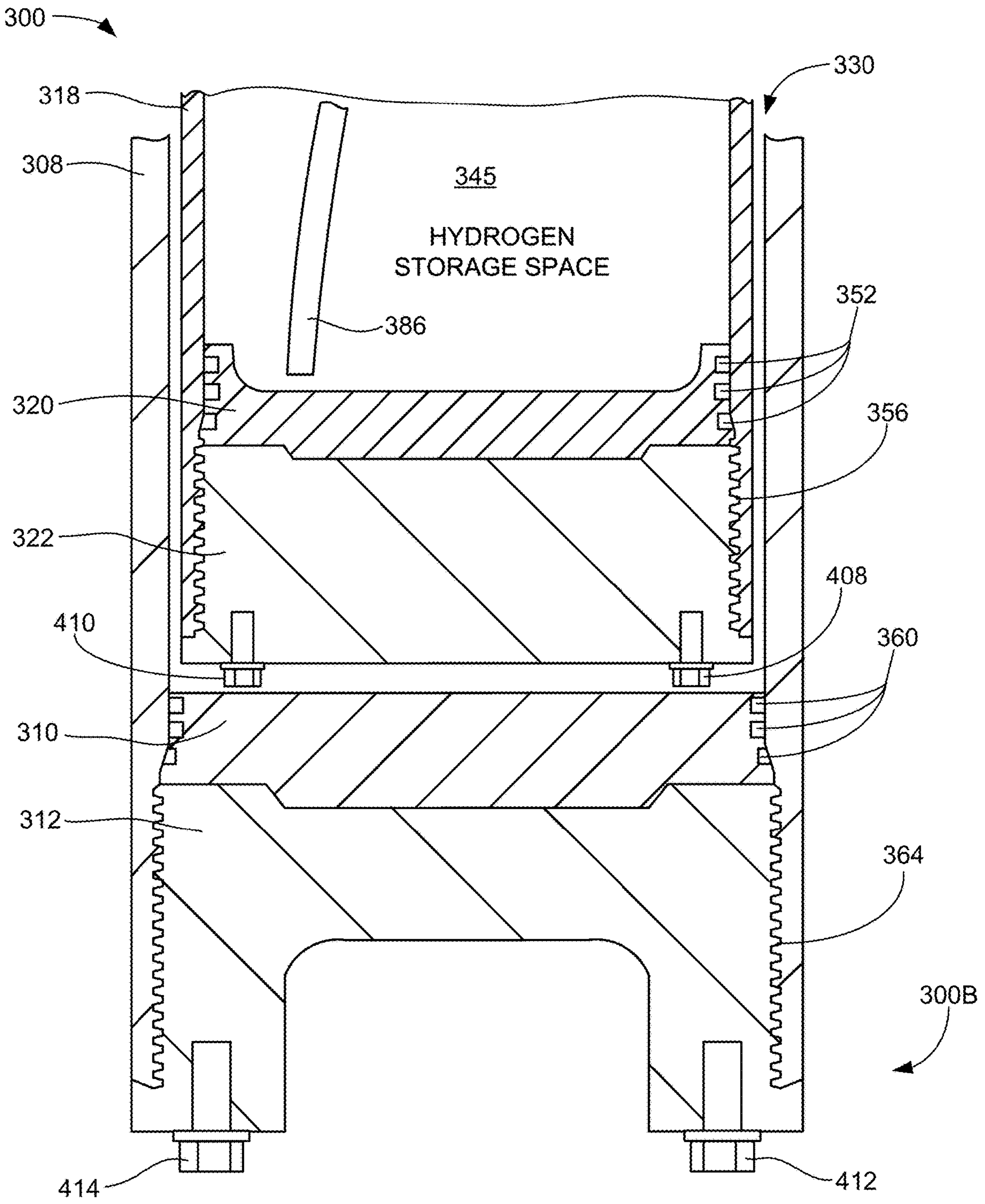

FIGS. 9A and 9B provide views of the container 300 in accordance with further embodiments. FIG. 9A shows an upper portion of the container including the upper sealing assembly 300A, and FIG. 9B shows a lower portion of the container including the lower sealing assembly 300B.

FIG. 9A illustrates the types of valves, conduits, instrumentation and other operational elements that can be connected to the container 300 during operation. These include hoses 370 and 372 which couple, via connectors 374 and 376, to the interior storage space 345 via the ports 342A/342B and the interior conduits 344A/344B. The hoses 370/372 can be flexible or rigid and formed of metal, rubber or some other suitable material rated to handle the high pressures involved in the storage and transfer of the pressurized hydrogen.

In some embodiments, the hose 370 is a primary delivery and supply conduit and interconnects, via a valve and meter junction 378, an upstream supply source (e.g., compressor via conduit 380) and a downstream user (e.g., client via conduit 382). In this way, hydrogen (or other stored gas) can be transferred into and out of the interior storage space 345 at the required pressures and volumes by switching the valving configuration of the valve and meter junction 378. The hose 372 is a secondary purge conduit and is coupled to a purge valve 384. The lower side of the plug 316 can utilize an internal purge tube 386 and associated connector 388 to purge the stored volume (including condensate) during a purging operation.

In an alternative embodiment, the first hose 370 is configured as a supply (inlet) hose and the second hose 372 is configured as a delivery (outlet hose). In this configuration, the pressurized gas is supplied from the compressor and introduced into the storage space 345 via the hose 370 and the associated conduit elements (e.g., connector 374, port 342A, internal conduit 344A), and the pressurized gas is supplied from the storage space 345 to the client using the hose 372 and associated conduit elements (e.g., connector 374, port 342B, internal conduit 344A). Separate valving and metering elements similar to that at 378 would be supplied for these respective lines. In this configuration, the outlet hose 372 can also be used as a purge line, with or without the purge tube 386 and connector 388.

Hoses 390 and 392 are coupled to the annulus 330 via connectors 394 and 396 which engage the ports 328A/328B and interior conduits 332A/332B discussed above. As before, the hoses 390/392 can take a variety of configurations and can be used to introduce and remove the liquid to and from the annulus space. The hose 390 is a primary conduit coupled to a displacement meter 398 and a supply/delivery valve 400. The hose 392 is a purge conduit coupled to purge valve 402.

It is contemplated that the annulus fluid will be introduced to the annulus 330 at a first pressure, and during pressurization of the interior space 345, the fluid will undergo a significant increase in pressure as the interior pressure of the hydrogen acts upon the sidewalls of the inner liner 318. This will transfer the force to the outer casing 308 so that the interior pressure is supported by both the inner liner and outer casing via the intervening noncompressible fluid.

In one non-limiting example, the hydrogen within interior volume 345 may be at an interior storage pressure in the range of about 10,000 to 12,000 psi or more, and the pressure of the fluid in the annulus 330 may be in the range of 8,000 psi or more. This range of pressures might breach or rupture the interior space without the presence of supporting fluid in the annulus. Other ranges may be observed or used, including but not limited to interior storage pressures of about 2000 psi, 5000 psi, 6000 psi, etc. and corresponding annulus pressures of from zero psi to 6000 psi or more, etc. It will be noted that a double walled storage container can be operated at these and other lower pressures that can be accommodated by the inner liner with or without supporting liquid in the annulus.

Finally, FIG. 9A further shows respective threaded fasteners 404, 406 which threadingly engage the apertures 324 that extend down through the top surface of the gland nut collar 302, as discussed above in FIG. 8. D-rings, pry bars, and other mechanisms can be coupled to or incorporated into the fasteners 404, 406 as required.

FIG. 9B shows the lower sealing assembly 300B of the container 300. A lower end of the purge tube 386 from FIG. 9A can be configured to extend to a position near the bottom of the hydrogen storage space 345. The annulus 330 can be provided with sufficient clearance to facilitate retention of lower fasteners 408, 410 which extend into the apertures 358 in the lower liner gland nut 322 (see FIG. 8). Fasteners are also shown at 412, 414 that extend into the apertures 366 of the lower casing gland nut 312.

Figure 10:
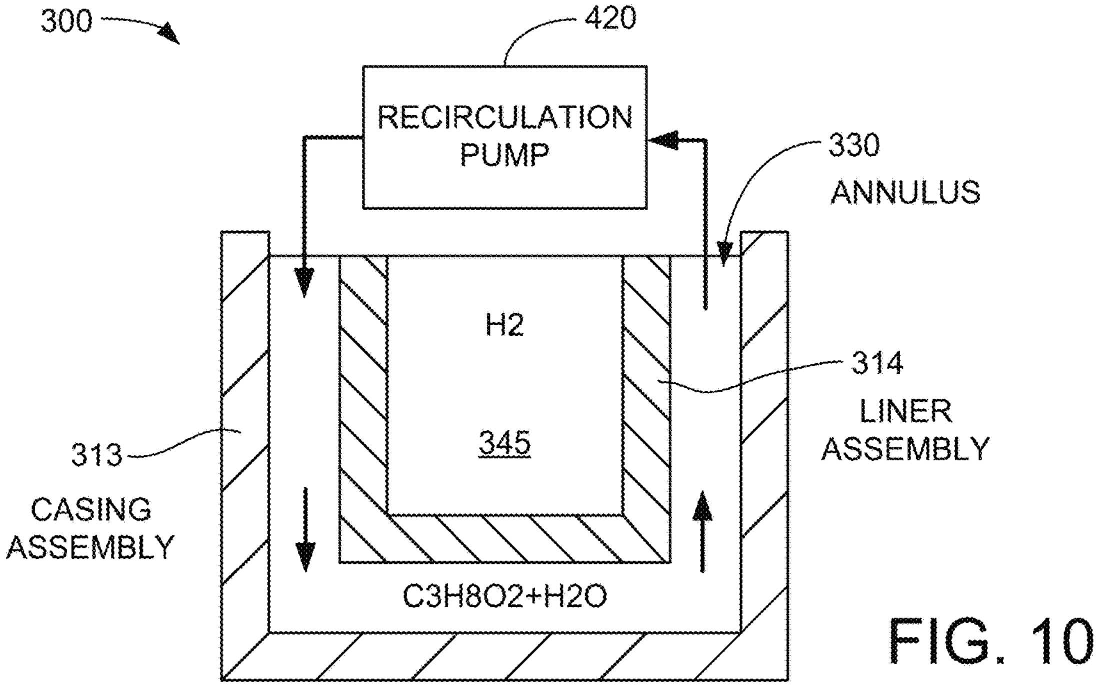
FIG. 10 is a schematic representation of aspects of the gas storage system in accordance with further embodiments in which a recirculation pump is used during operation and/or maintenance actions upon the system.

FIG. 10 is a schematic representation of aspects of the container 300 in accordance with further embodiments. It will be recalled from FIG. 7 that the container 300 is generally arranged as an outer casing assembly 313 and an inner liner assembly 314 which fits within the outer casing assembly. The annulus 330 constitutes the sealed separation space between these two assemblies and is filled with a suitable non-compressible fluid, such as liquid propylene glycol, at a suitable pressure and volume.

At this point it should be noted that the use of a non-hardening liquid (e.g., one that does not take a set such as curable epoxy, concrete, etc.) enables the annulus fluid to continue to flow before, during and after a pressurization cycle of the storage space within the inner liner. “Propylene glycol” as used herein will be understood by those skilled in the art as a solution that includes propylene glycol at a concentration (at vol. %) of from about 5% to about 99% or more. The remainder of the solution may be water or some other suitable substance. For reference, the freezing point of a water-glycol solution with 10% vol wt. propylene glycol is approximately-3 degrees Celsius (C). A 50% at vol. propylene glycol solution has a freezing point of approximately −34 degrees Celsius (° C.), and at 65% at vol. propylene glycol the freezing point is approximately −51° C. Some embodiments of the storage container 300 use propylene glycol with at vol. % values of 35%, 50% and about 99.9%, depending on the applicable environment.

Compressibility is the ability of a substance to be reduced in volume in response to the application of pressure. Bulk modulus k is the inverse of compressibility and thus represents the ability to resist such reduction in volume. It follows that a higher k value means a less compressible fluid. For purposes herein, the terms “incompressible,” “non-compressible,” and the like will be understood as a property of a material having a bulk modulus k that is equal to or greater than that of water.

While the compressibility of water varies slightly based on changes in temperature and pressure, a standard value for water is around $k=3.1\times10^5$ psi ($2.1\times10^9$ Pascals, Pa). By contrast, a standard value for a solution of water and propylene glycol is around $k=5\times10^5$ psi ($3.4\times10^9$ Pa). Other forms of glycol, such as but not limited to ethylene glycol (C2H6O2), can be used in similar concentrations as those set forth above. Non-hardening, incompressible fluids that are non-glycol based can also be used as desired.

Continuing with the embodiment of FIG. 10, a high pressure recirculation pump 420 is provided to recirculate the pressurized fluid within the annulus. Other mechanisms can be incorporated into this loop as well, such as the various valves and instrumentation discussed above in FIG. 9A, filters, heaters, water/gas separators, etc. . . . The recirculating fluid can be accessed via the respective ports 328A/328B (FIG. 8).

The pumping of the fluid can provide a number of advantages both during storage operations and during maintenance operations. The pumping of the fluid can be used to maintain constant flow and cross-sections, maintain uniform mixture and concentration levels, reduce impurities and gas bubbles, establish and adjust desired pressure ranges and temperatures, provide volumetric and other forms of real-time monitoring, etc. During storage, the recirculating fluid can ensure integrity of the pressurized fluid in transferring load from the inner layer sidewall to the outer casing sidewall. During maintenance, the fluid can be used to pump the liner assembly 314 in or out of the casing assembly 313. Other operations can be applied to the recirculating fluid by the pump 420 such as heating/cooling, changes in admixture, etc.

Figure 11A:
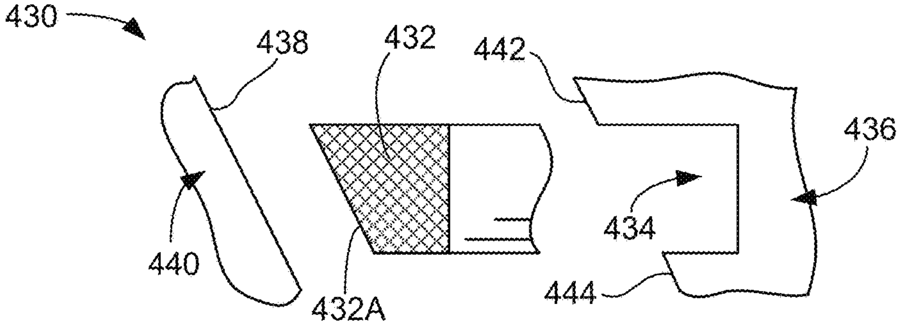
FIGS. 11A through 11C depict different sealing interfaces that can be used at various locations within the gas storage system in accordance with further embodiments.
Figure 11B:
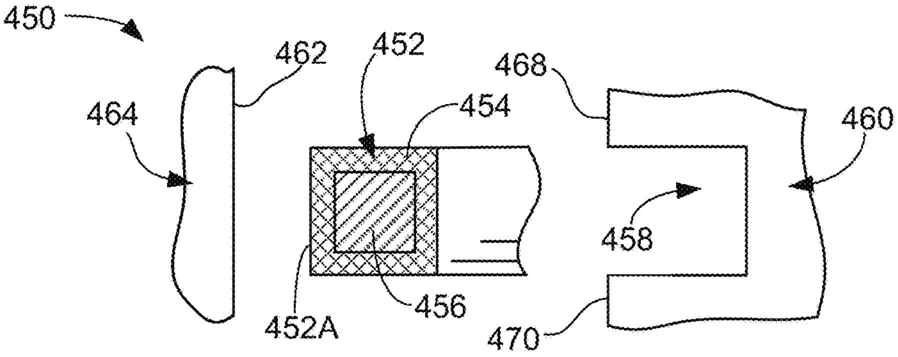
Figure 11C:
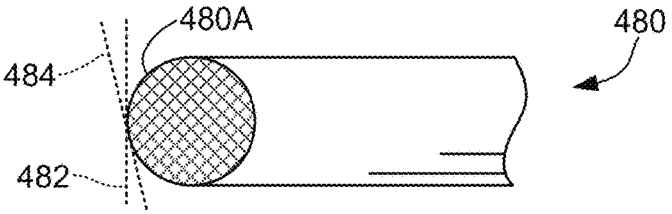

FIGS. 11A through 11C illustrate various sealing interface configurations that can be used in the container 300 in accordance with further embodiments. These various configurations are suitable for any number of different sealing locations within the container 300, such as between the top gland nut 304 and the casing 308 as shown in FIG. 8A, etc. As noted above, the sealing members can be formed of any number of suitable materials sufficient to establish a gas tight seal, such as but not limited to various polymers including PTFE, PEEK, and/or other polyimides; elastomers including various nitrides and/or hydrogenated rubbers such as HBR, HNBR, EDPM, etc., and so on. Each of the sealing members is arranged as an annular sealing member characterized as an o-ring.

FIG. 11A is an exploded representation of a first sealing interface 430 in which an annular sealing member 432 is provided with a trapezoidal cross-sectional shape. The member 432 fits within a corresponding trapezoidally shaped retention groove 434 that extends into and around a first member 436. A facing sealing surface 432A of the sealing member 432 contactingly engages a tapered sealing surface 438 of a second member 440. In some embodiments, a metal-to-metal sealing contact is further established between the tapered sealing surface 438 and correspondingly shaped tapered surfaces 442 and 444 of the first member 436. While not limiting, it is contemplated that the sealing member 432 is formed of an elastomeric polymer that is compatible with high pressure hydrogen.

FIG. 11B shows another sealing interface 450 having a sealing member 452 with a square or rectangular cross-sectional shape. In this case, the member 452 is a reinforced o-ring with an outer elastomeric layer 454 supported by an inner reinforcing ring of metal or similar. Reinforced sealing members can be utilized in the embodiment of FIG. 11A as well, and can help reduce leakage and blowout conditions when changes in pressure are experienced.

As before, the sealing member 452 fits within an annular groove 458 in a first member 460, and has a forward facing surface 452A that sealingly engages a sealing surface 462 of a second member 464. Metal-to-metal sealing may further be provided between surface 462 and surfaces 468, 470.

FIG. 11C shows another sealing member 480 that can be used in various embodiments. The sealing member 480 has a circular cross-sectional shape, and can be inserted into substantially any suitably shaped annular recess including the recesses 434 and 458. A circumferentially shaped outer sealing surface 480A can contactingly engage associated sealing surfaces at substantially any desired angle, including tangential (line 482) or tapered (line 484).

The various embodiments discussed thus far in FIGS. 1-11C can be viewed as dual liner storage containers adapted to store any number of different pressurized gases at relatively high pressures. While not limiting, it is contemplated that such pressures may be in the range of from about 8,000 psi to about 15,000 psi depending on the requirements of a given application. Pressures higher or lower than this range can be used. Hydrogen gas (H2) is a particularly suitable candidate for such storage systems, as H2 is often provided at a suitable delivery pressure such as 10,000 psi.

Figure 12A:
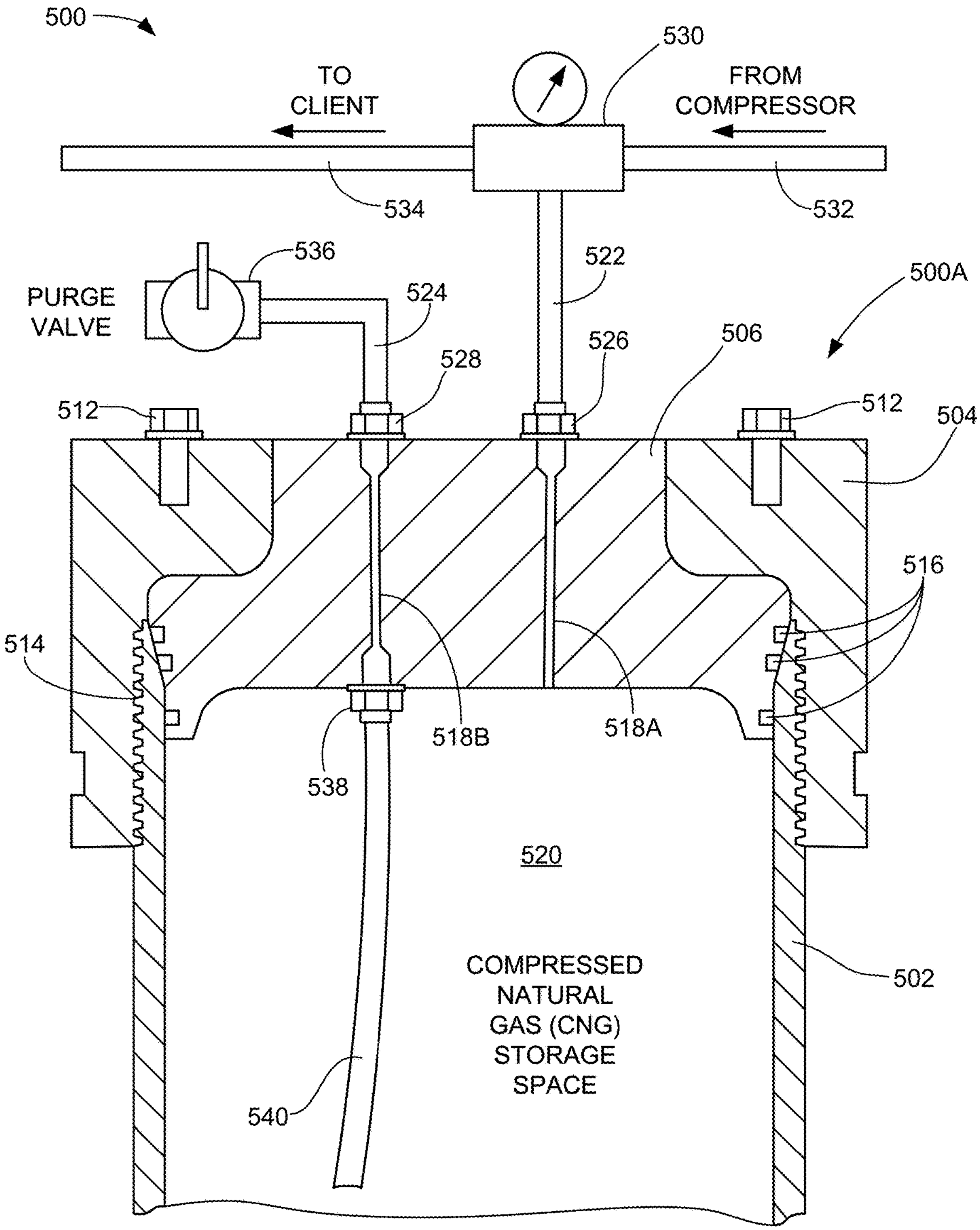
FIGS. 12A and 12B illustrate yet another gas storage system in accordance with further embodiments.
Figure 12B:
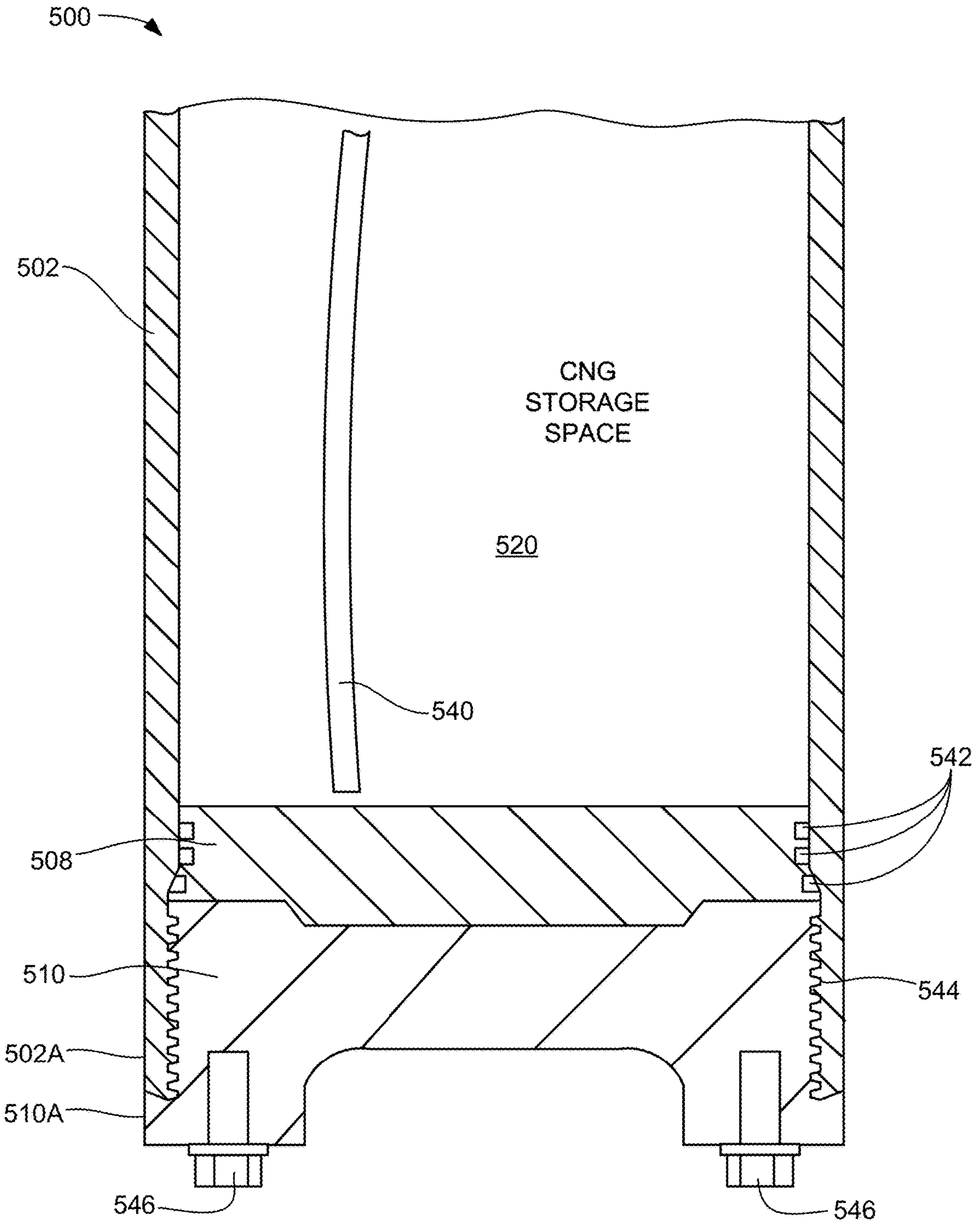

FIGS. 12A and 12B show another subsurface gas storage system (container) 500 in accordance with further embodiments. The container 500 is characterized as a single liner system and can accommodate the storage of a variety of different high pressure gases at relatively lower pressures. While not limiting, it is contemplated that such pressures may be in the range of from about 1,000 psi to about 6,000 psi depending on the requirements of a given application. Pressures higher or lower than this range can be used. Compressed natural gas (CNG) is a particularly suitable candidate for such storage systems, as CNG is often provided at a suitable delivery pressure such as around 4,500 psi.

The container 500 has a total of five (5) main components, namely a cylindrical casing 502; an upper flange collar 504; an upper plug 506; a lower plug 508; and a lower gland nut flange 510. The collar 504 and plug 506 form an upper sealing assembly 500A depicted in FIG. 12A, and the plug 508 and lower gland nut flange 510 form a lower sealing assembly 500B depicted in FIG. 12B. Because of the reduced pressure requirements of the CNG container 500 as compared to the H2 container 300, the casing 502 may have a thinner sidewall thickness as compared to the sidewall thickness of the casing 308. The overall lengths and cross-sectional sizes of the respective containers 300, 500, however, may be nominally the same.

As shown in FIG. 12A, threaded fasteners 512 extend into corresponding apertures within a top surface of the upper collar flange 504 for manipulation purposes. A set of threads 514 are used to threadingly engage and secure the collar 504 onto the casing 502, thereby compressing the plug 506 and establishing a gas-tight sealing interface using annular sealing members 516.

Interior conduits 518A, 518B extend through the upper plug 506 to provide fluidic communication with an interior storage space 520, which in the present example is configured to store a volume of CNG at a nominal storage pressure of about 4,500 psi.

Primary and secondary hoses 522 provide access to the storage space 520 using connectors 526 and 528. The primary hose 522 facilitates transfers of CNG into and out of the storage space 522 using an instrumentation valving arrangement 530 coupled to an inlet conduit 532 from a compressor and an outlet conduit 534 coupled to a downstream client (user). The secondary hose 524 serves as a purging conduit and is coupled at one end to a purge valve 536 and at a second end to an interior connector 538 and purge tube 540 that extends to a lower portion of the storage space 520, as shown in FIG. 12B.

FIG. 12B further shows a sealing interface for the lower plug 506 formed by annular sealing members 542, threads 544 that enable installation of the lower gland nut flange 510 onto the bottom of the casing 502, and manipulation fasteners 546 extending from the bottom of the lower gland nut flange 510. As with the configuration of the storage container 300, the storage container 500 has a recessed gland nut configuration so that an outer circumferentially extending sidewall surface 502A of the casing 502 nominally aligns with an outer circumferentially extending sidewall surface 510A of the lower gland nut 510.

Figure 13:
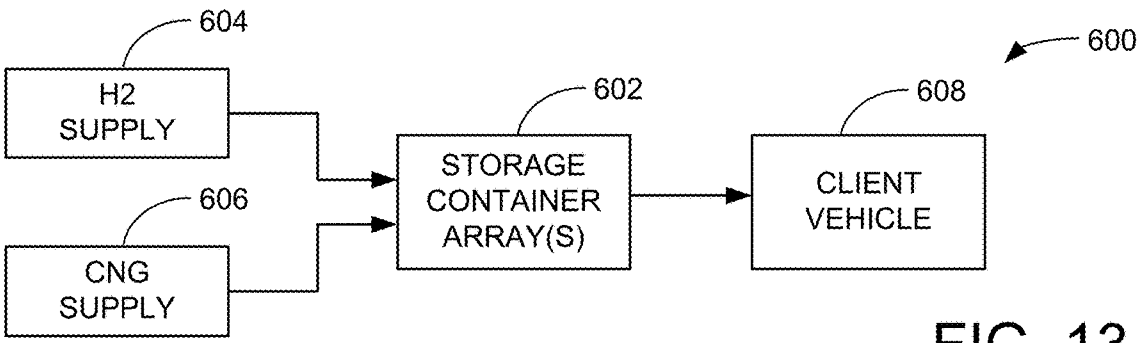
FIG. 13 is a functional block representation of a high pressure gas storage and delivery system that utilizes the various storage systems of FIGS. 1 through 12B in accordance with some embodiments.

The storage containers described herein can be used in a variety of different applications. FIG. 13 provides a functional block representation of a vehicle fueling station 600 configured to provide pressurized gas to various vehicles configured to operate thereon. Such vehicles may be adapted to operate on H2, CNG, a mixture of both, multiple different fuels (e.g., a hybrid vehicle that can operate using liquid gasoline from a gasoline fuel tank and switch over to CNG or H2 from a pressurized fuel tank), and so on.

In the present example, an array of storage containers is generally denoted at 602. The array may be formed of both double and single walled (liner) containers such as 300 and 500 to supply both H2 and CNG on demand as required. While both H2 and CNG are shown, this is not required, as a single type of gas can be stored and dispensed.

The H2 is supplied to the double liner containers in the array 602 from a hydrogen source 604, and the CNG is supplied to the single liner containers in the array 602 from a CNG source 606. The H2 can be generated in any suitable way including the use of an electrolyzer to generate a stream of H2 gas from water. The H2 can be generated on-site or transported to the site. A compressor can be used to provide the H2 at the desired pressure (in this case, about 12,000 psi).

In similar fashion, the CNG will likely be generated or obtained from an underground oil and gas formation and transported to the site via a pipeline network, storage trucks, etc. As before, a compressor may be used to provide the CNG at the desired pressure (in this case, about 5,000 psi). It will be appreciated that the CNG and H2 will be stored in different types of containers, and sets of the containers may be coupled using a manifold or other arrangement to provide a larger total storage space.

A client vehicle is depicted at 608. It is contemplated that the vehicle will be driven by a user to a refueling dispenser and a suitable hose/nozzle connection will be established to transfer a quantity of the desired gas to a pressurized storage tank of the vehicle.

At this point it will be noted that the pressures of the stored H2 and CNG are established to allow direct refueling transfer into the vehicle tank without the need for an intervening compressor or other mechanism to adjust the required delivery pressure. That is, the storage pressure within the array 602 will be equal to or greater than that pressure required to transfer the desired volume into the tank. This will expedite the fueling process, allowing a typical pressurized fuel tank to be filled in a reasonably short period of time, such as a few minutes as is currently typical for the fueling of a gasoline tank with gasoline from a gasoline pump dispenser.

Figure 14:
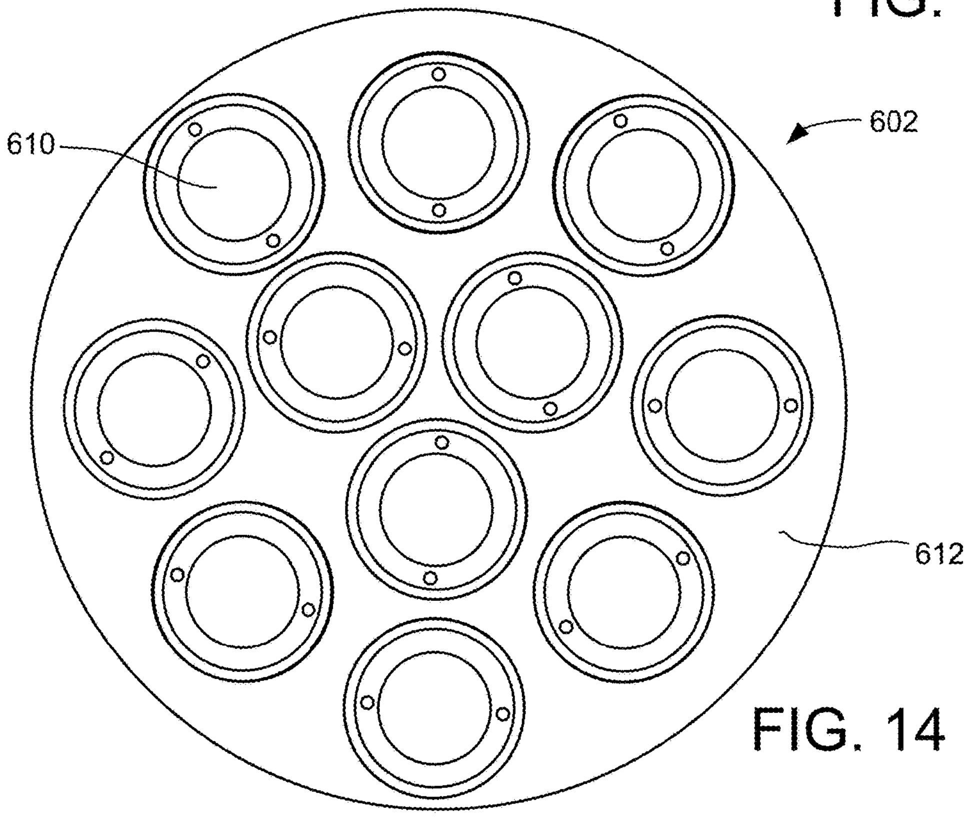
FIG. 14 is a top plan representation of a storage pod of containers that can be incorporated into the storage array of FIG. 13.

FIG. 14 is a top plan schematic representation of a portion of the storage container array 602 from FIG. 13 in accordance with some embodiments. Other arrangements can be used so that the embodiment of FIG. 14 is merely exemplary and is not limiting. In the example of FIG. 14, a total of eleven storage containers 610 are grouped together into a "set" or "pod" and supported by a support member 612. The support member may take the form of a plate, a bracket, or some other configuration that provides apertures through which each of the respective containers extend in spaced-apart relation.

The containers may be all the same type (e.g., similar to the double walled containers 300 discussed above) or may be different types (e.g., some of the containers 610 are double walled and some are single walled. Appropriate interconnections among the containers 610 will be provisioned but has been omitted from FIG. 14 for purposes of clarity of illustration. The containers are contemplated as extending downwardly into a subsurface formation with the plate 612 at or near ground level.

The arrangement in FIG. 14 is generally circular albeit somewhat irregular. Other pod arrangements can be used as desired, including a generally circular (honeycomb) arrangement 602A in FIG. 15A having seven (7) containers 610, and a generally rectangular configuration 602B in FIG. 15B having ten (10) containers.

Figure 16:
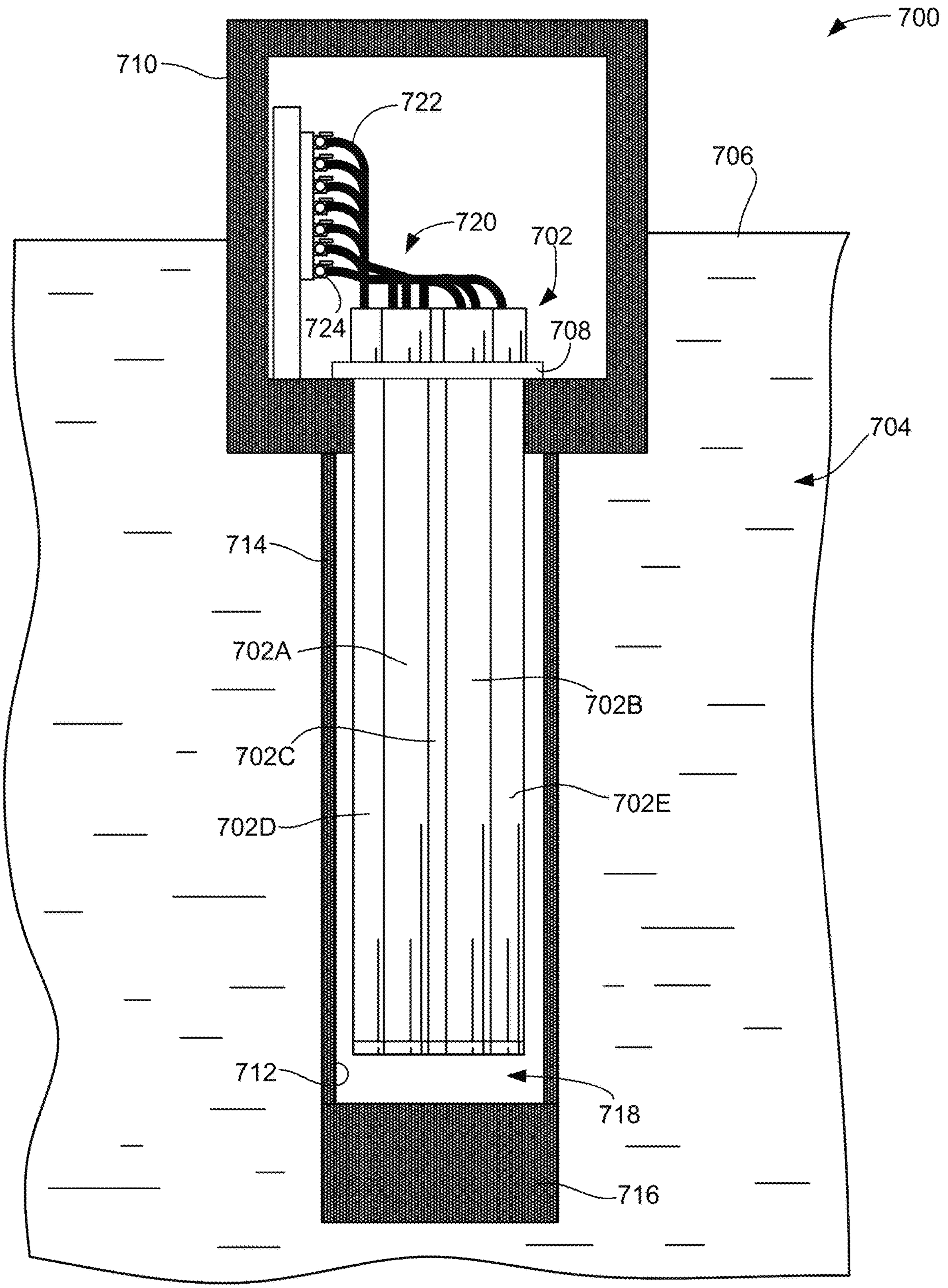
FIG. 16 shows a subsurface storage system constructed and operated in accordance with further embodiments.

FIG. 16 shows aspects of another storage system 700 in accordance with further embodiments. The storage system 700 can be readily incorporated into the system 600 of FIG. 13. The system 700 includes one or more arrays 702 of storage containers that extend downwardly into a subsurface formation 704 from near a surface level 706.

Figure 15A:
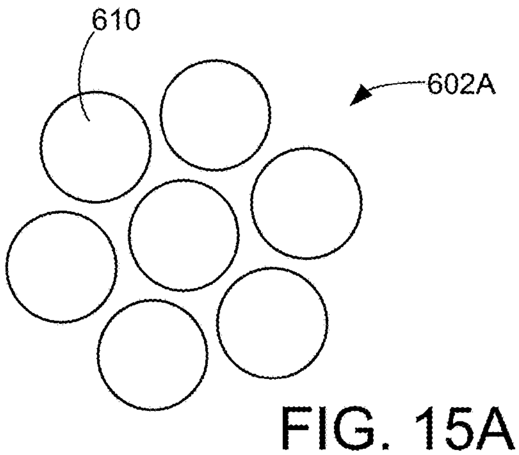
FIGS. 15A and 15B show further alternative arrangements of containers in a pod similar to that shown in FIG. 14.
Figure 15B:
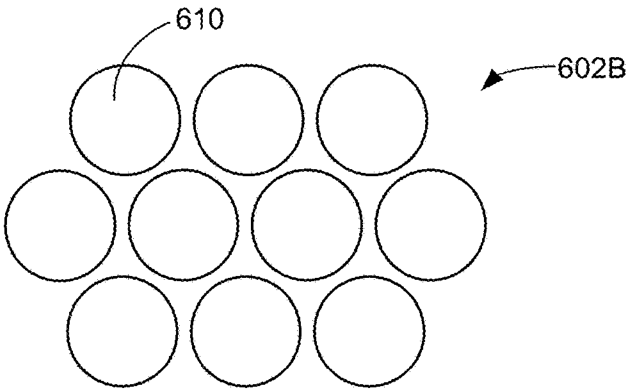

The array 702 includes a total of seven (7) storage containers in a circular honeycomb arrangement similar to that shown in FIG. 15A. Of these, five of the storage containers are fully or partially visible in FIG. 16 and are denoted respectively at 702A, 702B, 702C, 702D and 702E. For reference, containers 702A and 702B are closest to the viewer, 702C is located in the center of the array and is partially obscured by containers 702A/702B, and containers 704D and 704E are on opposing ends of the array and are also partially obscured by containers 702A/702B. The two remaining members of the array are in the back and are not visible in FIG. 16.

The storage containers 702A-702E are supported by a support plate 708 and are housed within an environmentally sealed enclosure 710. The enclosure may be formed of concrete or other suitable material to provide safety and security. The storage containers 702A-702E extend downwardly into a well bore (hole) 712. The well bore may be lined with a suitable material 714, such as an additional quantity of concrete. A lower pad 716 may further be formed of concrete or similar at the bottom of the bore 712. This provides a second annulus space 718 between the storage containers and the sidewalls of the bore 712. Normally, this second annulus space 718 will be filled with air at atmospheric pressure, although other fluids and pressures can be used as desired.

Any number of different sizes and dimensions can be used. By way of illustration and not by limitation, the arrangement in FIG. 16 has a well bore with a diameter of about six (6) feet, ft. and a depth of about 50 ft. Each of the storage containers has an outermost diameter of about 20 inches, in. and an overall length of about 48 ft. The storage array 702 can be raised and lowered as an assembly, or individual containers can be removed, replaced and/or serviced as required. While not shown in FIG. 16, a second support plate similar to the top support plate 708 can be affixed to the lower ends of the containers 702A-702E to further interlockingly support the containers within the well bore.

A transfer assembly is generally denoted at 720 and includes piping 722, valves 724 and other elements as described above to facilitate transfer of pressurized gas into and out of the array 702. Additional features that have been omitted from the diagram of FIG. 16 include transfer conduits in and out of the array, drainage lines, access panels, and so on. In some cases, the grade of the surface 706 may be sloped upwardly towards the enclosure 710, and landscaping can be supplied to further obstruct the enclosure. It will be appreciated that the storage provided in the system 600 of FIG. 13 can be formed from any number of adjacent systems 700 as in FIG. 16. A large "storage farm" can be made up of many such arrays packed closely together or spaced widely apart over a large interior or exterior area.

Figure 17:
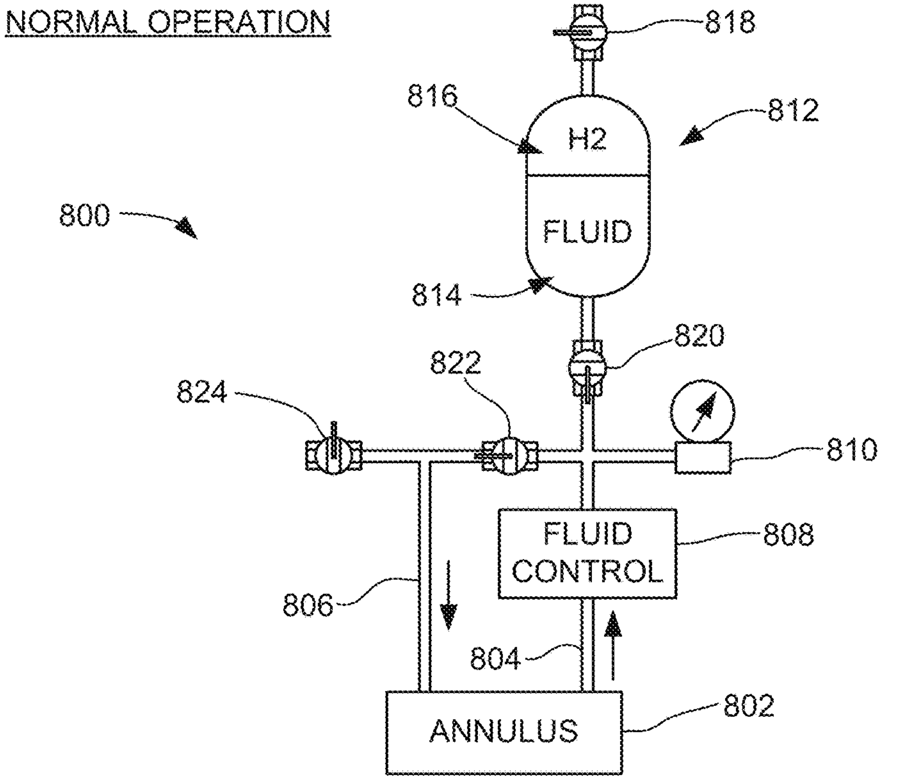
FIG. 17 shows aspects of yet another gas storage system constructed and operated in accordance with further embodiments.

FIG. 17 shows relevant aspects of another storage container 800 constructed and operated in accordance with further embodiments. The container 800 is similar to the double walled containers described above and includes an annulus 802 configured to be operated to support an inner liner under pressure as before. FIG. 17 depicts the storage container 800 during normal operation to store and dispense gas (e.g., hydrogen) within the interior storage space.

The annulus 802 is coupled via conduits 804 and 806, which correspond to the lines 390, 392 and associated conduit elements from FIG. 9A. A fluid control mechanism 808 represents various elements used to control the flow and use of the annulus fluid, as described below. A pressure meter is depicted at 810.

Of particular interest in FIG. 17 is the inclusion of a hydrogen (gas) accumulator 812. The accumulator 812 is provided with an interior volume sufficient to allow hydrogen gas 816 (or other gases) to accumulate in a vapor space above a portion of the annulus fluid 814. Various control valves are depicted at 818, 820, 822 and 824. These valves are similar to the valves discussed above and can be manually operated by a user or configured to be actuated by an actuator mechanism (not separately shown) via a control input (e.g., mechanical, electrical, hydraulic, etc.).

It will be appreciated that when storing hydrogen, some amount of permeation through the seals of the liner may tend to occur. Any hydrogen escaping through the seals will enter into the annulus (annular space) between the liner and outer casing. This annular space is filled with propylene glycol (or other fluid as described above). As hydrogen is not miscible in propylene glycol, and because propylene glycol is about twenty-one (21) times denser than the hydrogen in the annulus ($H_2$@8000 psi), the hydrogen will tend to float in the annular fluid.

The vertical orientation of each cell in the pod will allow this hydrogen to accumulate at the top of the annulus under ports which will be used for filling the annular fluid and for removing hydrogen from the annulus. When these ports are attached to a manifold as shown, the floating hydrogen can be collected in the accumulator for periodic removal.

FIGS. 18A through 18E depict a filling process that can be carried out to fill the annulus 802 and place the container 800 in condition for normal operation as shown in FIG. 17. Other sequences and equipment can be used, so that the sequence is merely exemplary and is not limiting.

Figure 18A:
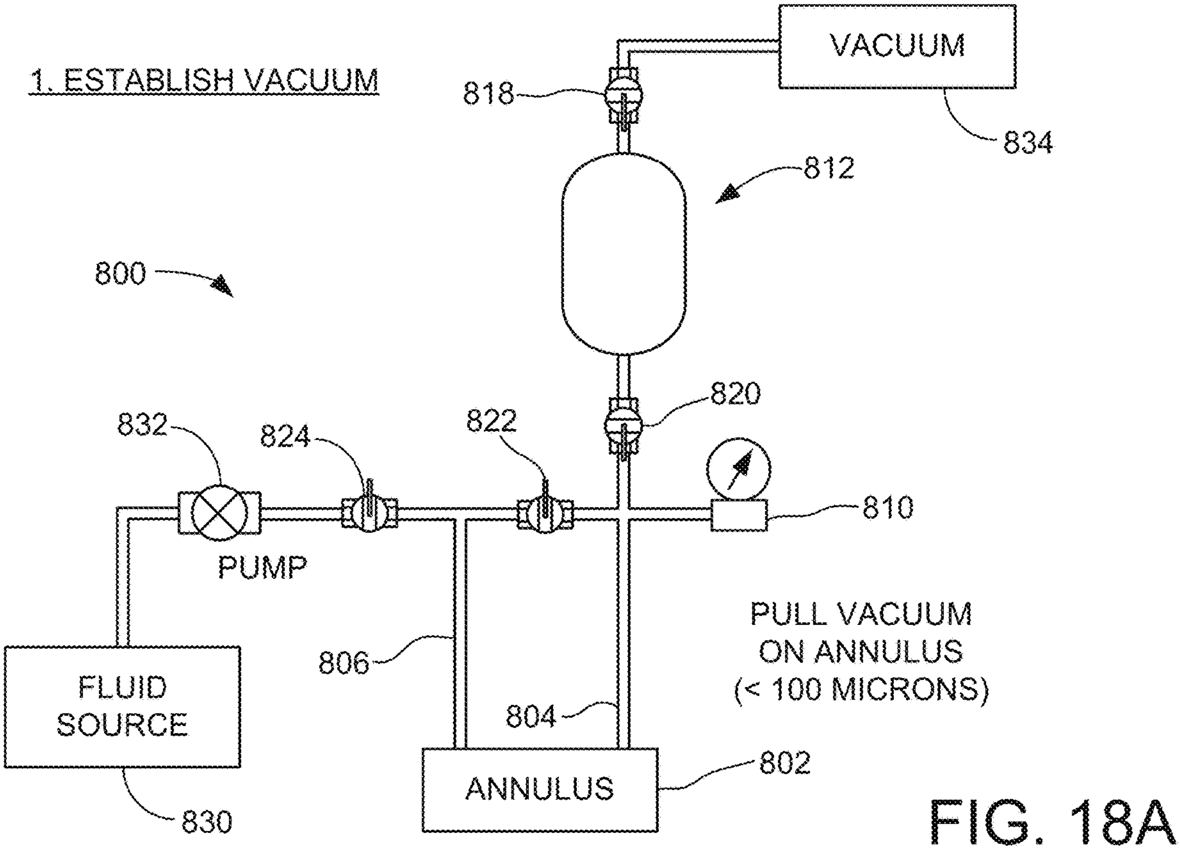
FIGS. 18A through 18E depict an initialization sequence utilized in accordance with some embodiments to place the gas storage system of FIG. 17 into a normal operational mode.

In FIG. 18A, a first step involves establishing a vacuum within the annulus and associated conduits. To this end, a fluid source 830, a high pressure delivery pump 832 and a vacuum source 834 are connected to the container 800 as shown. Initially, the fluid source 830 and pump 832 remain in a non-operative state, and the top (bleed) valve 818 is opened to provide fluidic communication between the vacuum pump 834 and the system.

In order to efficiently transfer pressure from the liner to the outer casing, substantially all gas must be removed from the annulus. The vacuum pump 834 is thus operated until a desired level of vacuum (negative pressure) is reached. In one example, a vacuum of at least 100 microns is achieved, although other values can be used.

Figure 18B:
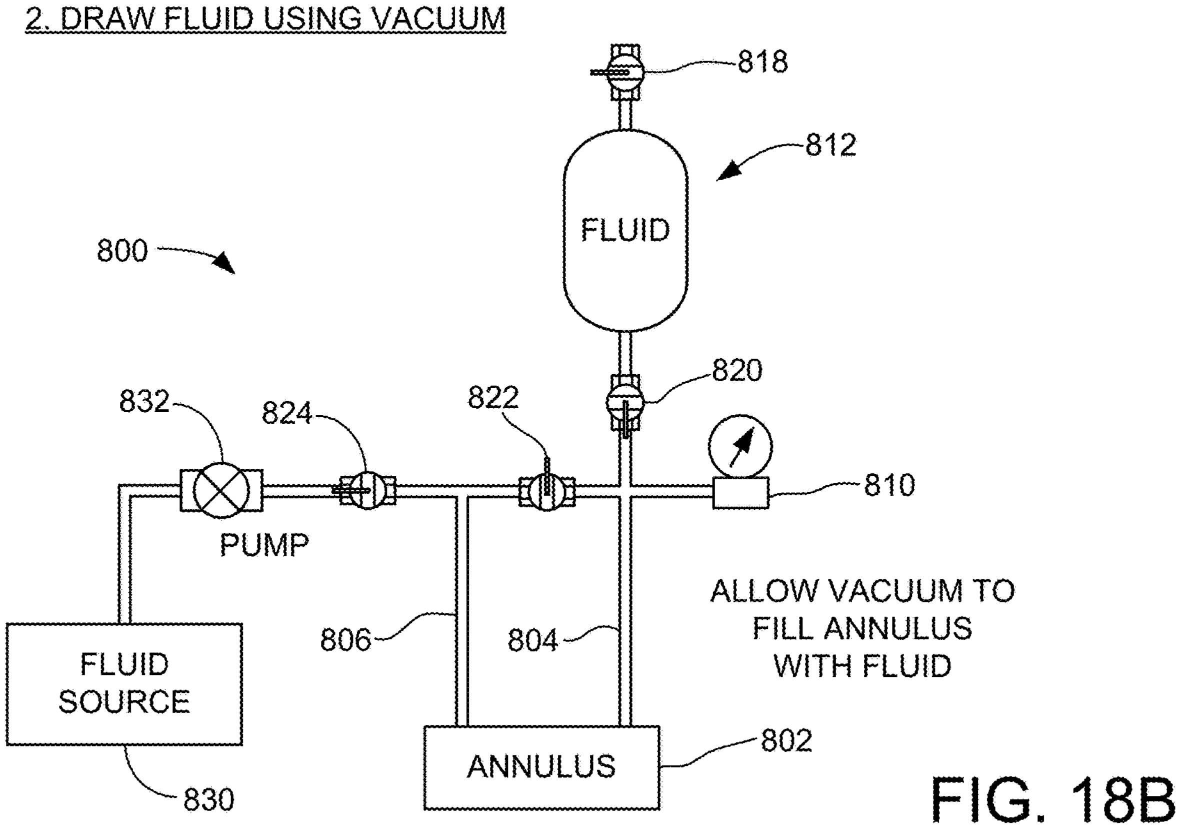

FIG. 18B provides a second step in which the annular space is initially filled with the annulus fluid. The upper bleed valve 818 is closed, and the vacuum pump 834 can be removed at this point. The vacuum retained within the system is used to slowly draw a quantity of the annular fluid into the system via the fluid source 830 by slowly opening the inlet valve 824 until the space is filled. The pump 832 remains in a non-operational state during this filling operation. It will be appreciated that the annulus fluid will achieve a pressure of around 1 atmosphere, atm (14.7 psi) or so at this point.

Figure 18C:
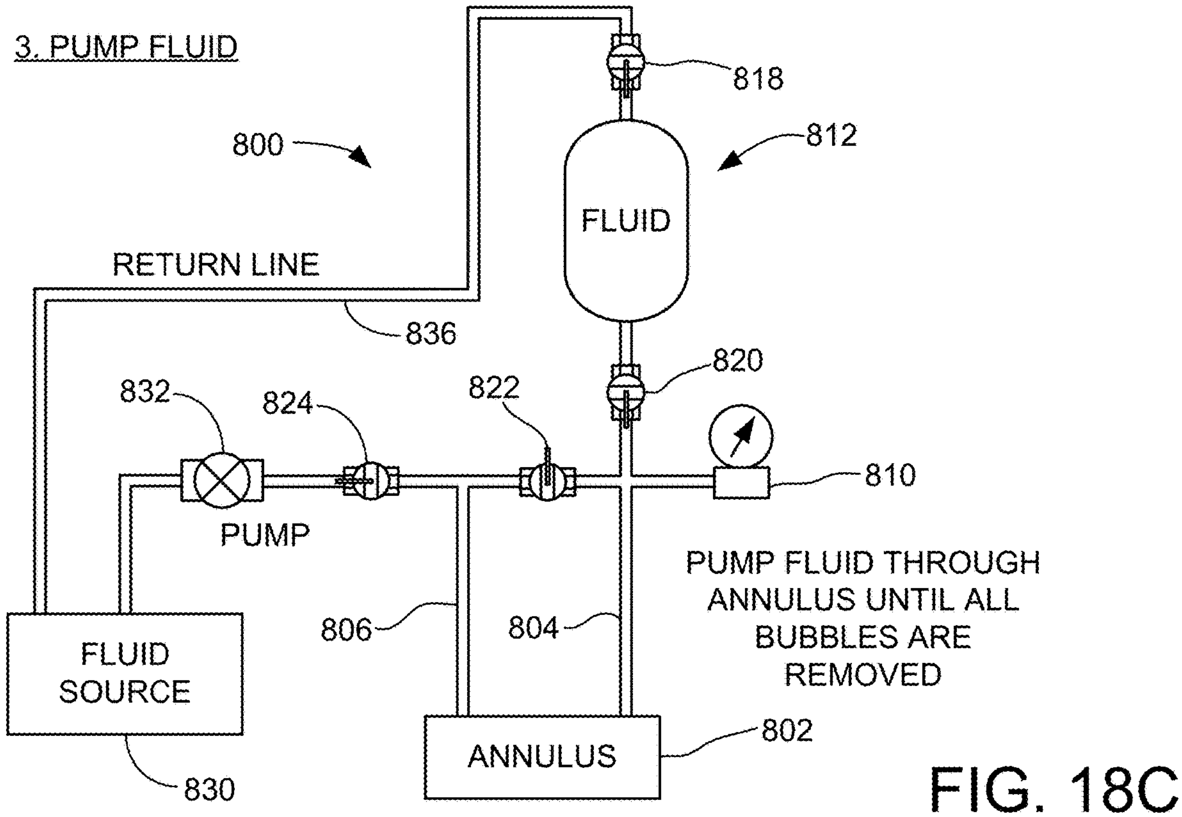

FIG. 18C shows a third step that takes place once the system is filled with the annulus fluid. A return line 836 is attached the bleed valve 818 and coupled to the fluid source 830, the bleed valve 818 is opened, and the high pressure pump 832 is activated. This operation recirculates the annulus fluid through the system until no bubbles are present in the return stream. It is contemplated the annulus fluid will remain at a relatively low pressure during this operation.

Figure 18D:
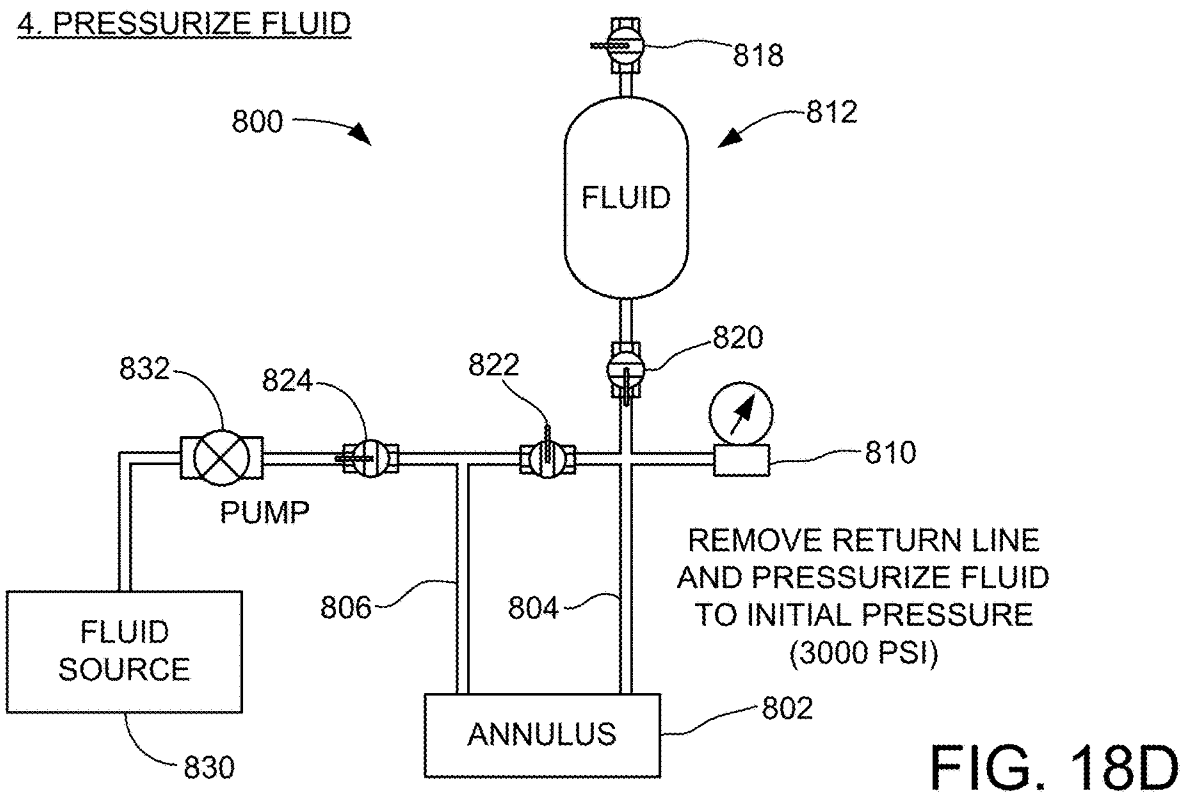

FIG. 18D illustrates a fourth step in which the annulus fluid is pressurized to a desired initial pressure. The bleed valve 818 is closed and the return line 836 is removed. The high pressure pump 382 is reactivated and operated until the annular pressure reaches a desired level. Once the annulus is pressurized, the inlet valve 824 is closed and the fluid source 830 and pump 832 can be removed.

It is important to note that any number of suitable pressure ranges can be used to pre-charge the annulus 802, provided sufficient pressure is supplied to the annulus to provide efficient liner support under load from the interior storage space, and the collapse strength of the liner is not exceeded while the interior storage space is unloaded. In one non-limiting example, the liner is formed of L80 HC steel with a collapse strength of about 4,600 psi, and the casing is formed of Q125 HP steel with a yield (burst) strength of about 12,500 psi. In this case, the annulus pre-charge pressure is brought to a level of around 3000 psi, which is a significant value yet well below the maximum load (collapse strength) of 4600 psi for the unsupported liner.

Figure 18E:
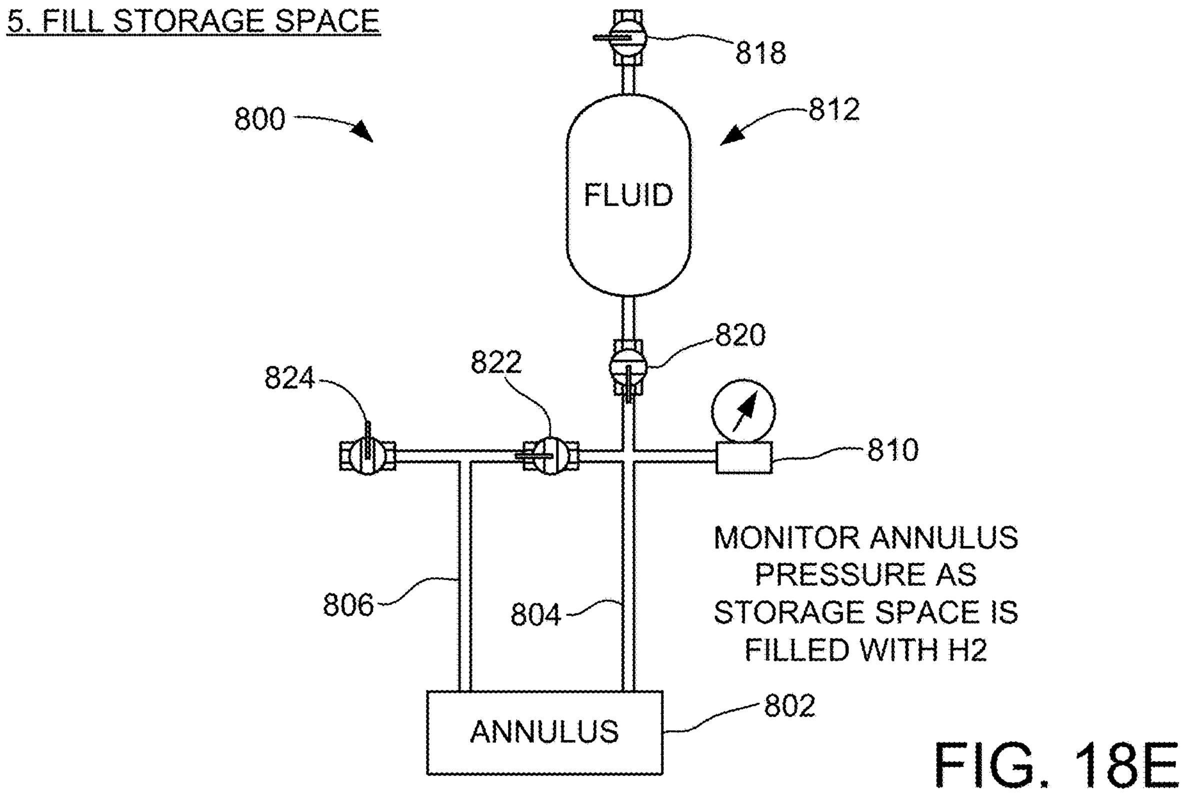

FIG. 18E shows a fifth and final step in which the interior storage space is pressurized with hydrogen (or other gas). The annulus pressure will be monitored during this step, as well as during subsequent operation of the container. In some embodiments, pressure readings are obtained and logged for each increase in interior pressure (hydrogen) of 100 psi during the filling of the interior storage space.

Figure 19:
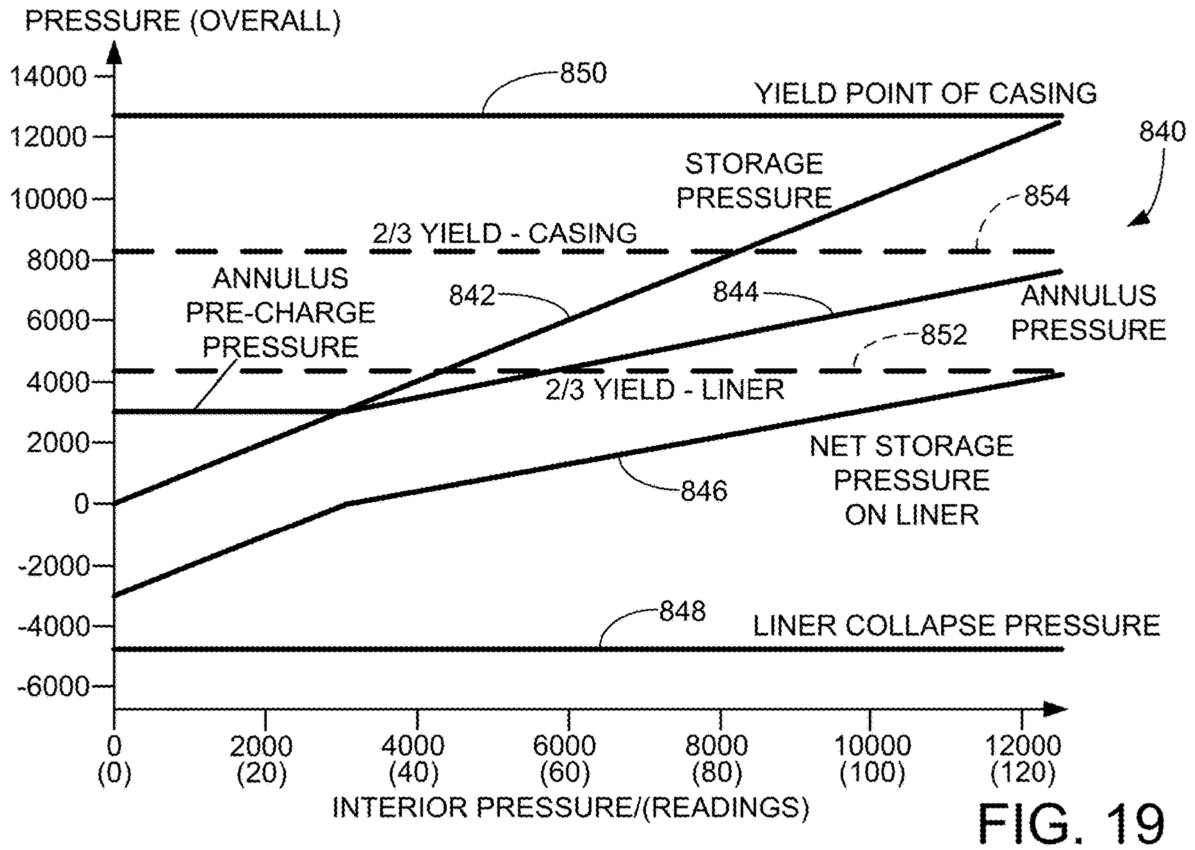
FIG. 19 is a graphical representation of various pressure ranges and relationships of the gas storage system during the sequence of FIGS. 17 and 18A-18E in some embodiments.

FIG. 19 is a graphical representation of a family of pressure curves 840 associated with the container 800 during the operations of FIGS. 17 and 18A-E. The curves 840 are plotted against an overall pressure y-axis (vertical) and an interior storage pressure x-axis (horizontal). The graph in FIG. 19 contemplates a sealed system, that is, substantially no hydrogen is present in either the annulus or the accumulator.

A storage pressure curve 842 is substantially linear and represents the full range of interior pressures within the interior storage space as the hydrogen (or other gas) is introduced. As noted above, pressure values can be recorded for each 100 psi increment increase in the hydrogen introduced into this storage space. This is denoted along the horizontal axis in FIG. 19; for example, twenty (20) such readings were made between the 0 pressure and 2000 psi pressure values along the horizontal axis, and so on.

An annulus pressure curve 844 shows the pressure within the annulus 802. It can be seen that the annulus pre-charge pressure remains nominally constant at the pre-charge level (horizontal portion of curve 844) until the storage pressure within the interior storage space (curve 842) exceeds the precharge pressure, after point the pressure within the annulus increases linearly (linear portion of curve 844).

A net pressure curve 846 represents the net (differential or effective) pressure that is exerted upon the inner liner. Curve 846 begins at −3000 psi when the interior storage space is empty, reaches 0 psi once the interior storage pressure is equal to the pre-charge pressure, and then follows the same trajectory as curve 844 as the interior pressure continues to increase.

As noted above, the annular pre-charge pressure (e.g., 3000 psi) used in FIG. 19 is somewhat arbitrary. Other values can be used, provided that the following factors are observed:

1) the pre-charge pressure does not exceed the collapse strength of the liner (line 848);

2) the total storage pressure is maintained below the yield point of the outer casing (line 850);
3) the net pressure upon the liner (curve 846) does not exceed two-thirds (⅔) of the yield point of the liner (dotted line 852);
4) the annulus pressure (curve 844) does not exceed two-thirds (⅔) of the yield point of the outer casing (dotted line 854).

These hard stop parameters can be programmed into the controller logic of the monitoring system used to control the operation of the system.

It is contemplated that, should hydrogen collect in the accumulator as shown in FIG. 17, the pressure relationship between the storage pressure and the annulus pressure may change. If the fluid displaced by pressurization of the liner is very small, gas in the accumulator will remain at pressure even when the pressure in storage is reduced. As a result, gas in the accumulator will be more noticeable as storage pressure is reduced. This may significantly reduce the effective pressure on the liner to the point it will become negative and ultimately crush the liner if the negative effective pressure exceeds the collapse strength of the liner.

However, the monitoring supplied by the control logic of the monitoring system will detect the presence of leaking hydrogen (or other stored gas) and enable corrective actions to be taken automatically. Automated sensing and actuation mechanisms can be used such that, should a leak be detected, the storage container within a pod can be automatically isolated from the rest of the system, and a notification provided to monitoring personnel. The control logic of the control system will detect the need to remove gas from the annulus before a collapse or other catastrophic failure occurs. In further embodiments, the release of gas from the accumulator can be carried out automatically using a logic-controlled needle valve or similar on the accumulator.

Once the annular pressure returns to a normal level, the valve can be closed and the container operated as normal. Another alternative uses a pressure-controlled dump valve that bleeds excess annular pressure when the storage pressure is cycled. Such a valve could be plumbed so that exhausted gas exits the storage vault to open air where it can dissipate.

Should hydrogen fail to float and migrate to the accumulator at an appropriate rate, a high pressure circulating pump such as discussed above in FIG. 10 can be used to constantly flow the annulus fluid from the liner top to the accumulator and back. Such recirculation during storage conditions would also allow hydrogen to be actively removed from the annulus and collected in the accumulator.

Figure 20:
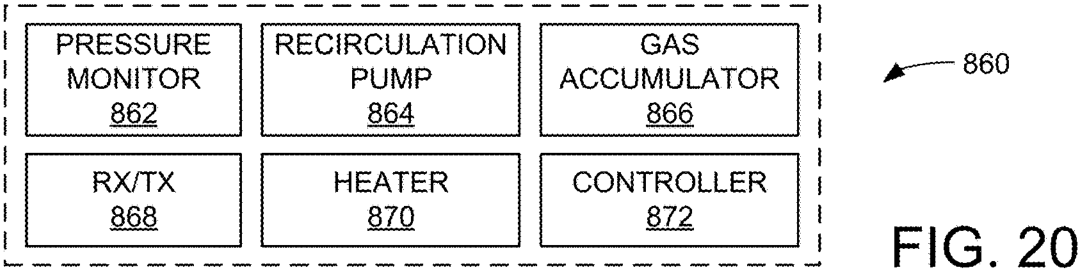
FIG. 20 shows a functional block representation of an annulus control mechanism used to control the operation of the gas storage system in some embodiments.

FIG. 20 is a functional block representation of an annulus fluid control mechanism 860 in further embodiments. The mechanism 860 can generally correspond to the mechanism 808 in FIG. 17 and can carry out various monitoring and actuation operations described herein. Other configurations can be used so FIG. 20 is merely exemplary and is not limiting.

The mechanism 860 in FIG. 20 is shown to include a pressure monitor 862, which can constitute one or more pressure sensors and related elements to monitor various pressures including interior storage pressure, annulus pressure, differential pressures, accumulator pressures, etc. While not shown, other types of sensors can be provisioned as well, including but not limited to temperature sensors, flow rate meters, specific gravity monitors, and so on.

A recirculation pump 864 is similar to the pump mechanism described above and can operate continuously or be switched in as needed based on pressure readings or other sensed parameters associated with the system. A gas accumulator 866 corresponds to the accumulator 812 and associated valving to accumulate gases, including leaked hydrogen, from the system. The accumulator 866 can be configured to periodically vent accumulated gases responsive to sensors and control logic.

A communication circuit 868 can provide wired and/or wireless communications (e.g., receiver Rx and transmitter Tx) capabilities to enable data and control commands to be communicated within the system and to/from a base system utilized by monitoring control personnel. An optional heater 870 can be utilized to supply desired heating and/or cooling to the annulus fluid and other aspects of the system. Finally, a controller 872 can be hardware and/or software/firmware based to provide electronic control, including control-logic, for the system. In some cases, the controller may include a hardware or programmable processor and associated memory to carry out the various control functions described herein.

As noted above, various embodiments can utilize propylene glycol as the annulus fluid. Some embodiments utilize a blend of about 94% propylene glycol and 6% non-water based additives such as corrosion resistance inhibitors, etc. One particularly suitable product is DOWFROST™ HD Heat Transfer Fluid, commercially available from the Dow Chemical Company.

In further embodiments, an emulsion of hydrogen absorbing particles, such as metal hydride particles, can be utilized in the annulus fluid to chemically absorb at least some amount of leaked hydrogen. Such particles can be incorporated into a base liquid such as propylene glycol or other substances as described herein, or incorporated into a semi-hardening material such as wax or epoxy that, while potentially hardening while in place, can be heated to return to a flowable state for removal from the annulus during a replacement operation. While such latter materials would not be considered "non-hardening," the materials would be flowable out of the annulus and could be utilized as described above during filling and replacement operations.

As discussed above, the total pressure in storage, the annular pressure, and the effective pressure of each pod can be monitored in real time and recorded. Seal integrity can be gauged by the frequency gas is required to be bled from the accumulator, as well as by other mechanisms as required. In addition, each storage pod can have an explosive gas detector capable of continuously detecting hydrogen and recording concentrations in real time. Electrical components used in the storage of flammable gases will be explosion proof and rated for operation in a flammable gas environment.

Figure 21:
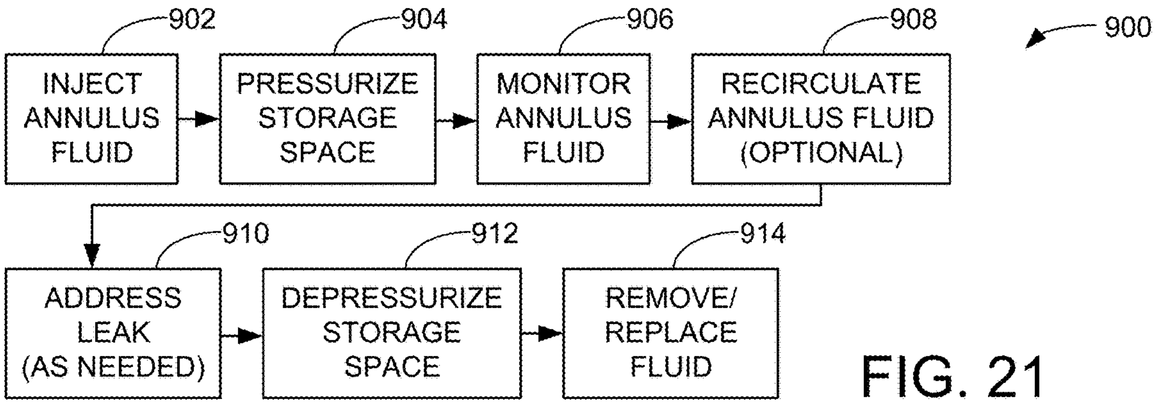
FIG. 21 is an operational sequence illustrative of steps carried out during initialization and use of the gas storage system in some embodiments.

FIG. 21 provides a flow diagram 900 for an operational sequence to set forth various steps that can be carried out in accordance with the foregoing discussion of FIGS. 17-20 to initialize and use a storage container such as 900. Other steps and actions can be taken as required.

At block 902, a volume of annulus fluid is injected and pressurized in the annulus space. This can include the various steps described above in FIGS. 18A-18D. At the conclusion of this operation, the annulus will be filled with the desired fluid at the desired pre-charge pressure, in accordance with the graph of FIG. 19. At block 904, pressurized gas such as hydrogen is introduced to the interior storage space. The gas is monitored using equipment as provided in FIG. 20. Once successfully filled, the dispensing and replenishment of the gas is provided as required to maintain the storage container (or pod of containers) charged with the desired volume of gas at the desired delivery pressure.

Block 906 shows an operation to monitor the annulus fluid. It is contemplated this is continuously carried out both during filling and storage conditions. Block 908 shows an optional operation of recirculating the annulus fluid. This can be carried out as described above on a continuous basis, a periodic basis (e.g., for X minutes every Y hours, etc.) or in response to particular sensor readings indicating the presence of gas within the fluid that requires remediation, such as collection and venting from the accumulator, etc.

Block 910 shows an operation to address a detected leaking condition of the stored hydrogen or other gas. This can include various steps described above including temporarily isolating the affected storage container from other containers within the same pod, activating the pump, venting the accumulator, transferring the stored hydrogen to another container, repair-in-place of the container, removal and replacement of the container, removal and replacement of an entire pod, and so on.

Blocks 902 through 910 thus represent the initialization and subsequent use of the storage container. Blocks 912 and 914 illustrate further maintenance operations that may be carried out, including the depressurization of the storage space 912 to fully purge the container as described above, followed by removal and replacement of the annulus fluid at block 914. These and other steps can be efficiently carried out as described herein.

Figure 22:
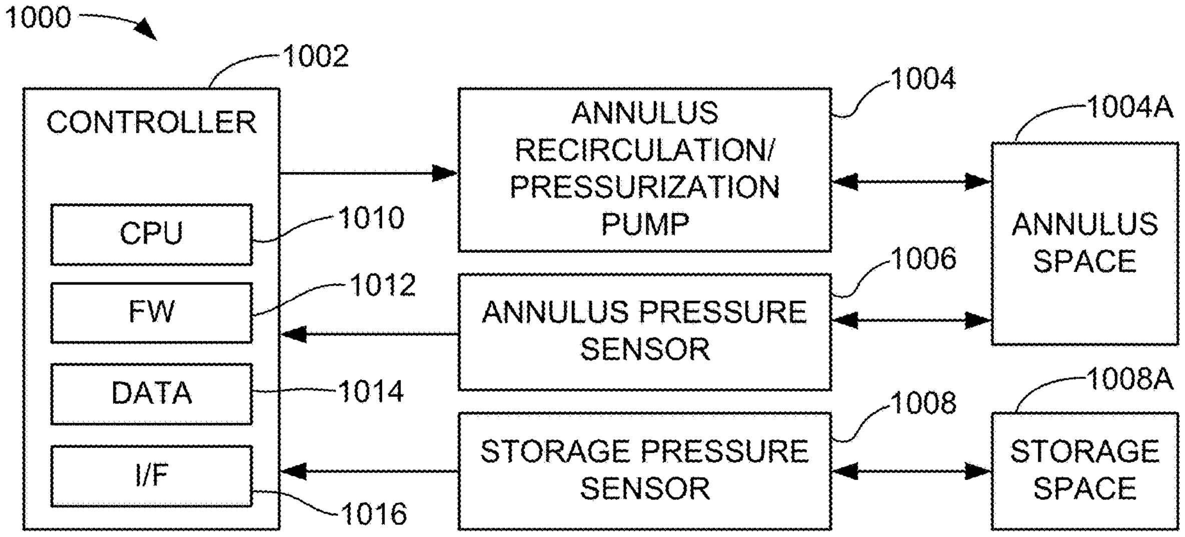
FIG. 22 shows a control assembly for another subsurface gas storage system in accordance with further embodiments.

FIG. 22 shows an annulus fluid control assembly 1000 constructed and operated in accordance with further embodiments to control one or more of the storage pods described above. The assembly 1000 includes a controller 1002 adapted to communicate with an annulus recirculation and pressurization pump 1004, an annulus pressure sensor 1006, and a storage pressure sensor 1008.

As described previously, the pump 1004 pressurizes and recirculates the annulus fluid (e.g., glycol, etc.) within an annulus space 1004A of the containers coupled thereto. The annulus pressure sensor 1006 monitors the pressure within the annulus space 1004A, and the storage pressure sensor 1008 monitors the pressure of the gas stored within a corresponding interior storage space 1008A of the containers. Any number of other parameters can be measured as well including temperature, volume, flow rates, demand, water or gas content, etc.

While not limiting, in some embodiments the controller 1002 can include one or more microcontrollers (CPU) 1010, firmware (F/W) 1012 executed by the microcontroller(s), history data 1014 accumulated and used during operation as required, and an interface (I/F) circuit 1016 to enable communication with other system elements.

It is contemplated that during storage operations in which additional gas is added to the interior storage space 1008A, the system in FIG. 22 will operate to correspondingly increase the fluidic pressure of the liquid within the annulus space 1004A at a similar rate as that with which the gas pressure increases. During delivery operations during which gas is transferred out of the interior storage space 1008A, the system in FIG. 22 will operate to monitor the drop in fluidic pressure of the storage space and correspondingly bleed off or otherwise release the pressure within the annulus space 1004A to maintain the selected differential pressure range.

In cases where the controller 1002 detects, initiates or otherwise directs a filling or delivery operation, the controller can proactively initiate adjustments to the annulus pressure either prior to or after the commencement of the gas transfer event to ensure the differential pressure limits are maintained.

In some embodiments, the control assembly 1000 operates to maintain a differential pressure across the side walls of the inner liner within some selected operational range irrespective of the absolute values of the respective pressures within these chambers. This can be stated as follows, with PA representing the pressure of the liquid within the annulus 1004A, PS representing the pressure of the gas stored within the interior storage space 1997A, and X representing a selected constant pressure differential:

$$\text{Storage Pressure } (PS) = \text{Annular Pressure } (PA) + X \tag{1}$$

X may be defined as positive, negative, or zero pressure depending on the application. X remains essentially constant as the storage space is charged and discharged.

In this embodiment, the pressure of the annulus 1004A is generally maintained to be greater than the internal pressure of the storage space 1008A. In other words, (X) is positive and maintained within a selected threshold range. As hydrogen (or other gas) is introduced into the interior storage space 1008A, the pressure is monitored and the pressure of the liquid in the annulus space 1004A is increased at a similar rate to maintain the constant differential pressure (X) across the inner liner within the accuracy limits of the controller.

While any number of suitable values can be used, in one embodiment (X) is set at a value of nominally 100 pounds per square inch (psi), the annulus space is initially precharged to this level (100 psi), and thereafter, as H2 is introduced into the interior storage space, the pressure of the annulus fluid is increased at substantially that same rate to maintain the differential pressure (X) within the accuracy limits of the controller. Other ranges and values can be used.

Maintaining the pressure within the annulus space at a level that is greater than or equal to the pressure within the interior storage space, at least during times when the H2 pressure exceeds some minimum threshold amount, can advantageously further help to retain the H2 (or other stored gas) since the pressure outside the liner is greater than that from within the liner. This is not required, however.

In other embodiments, the pressure of the annulus space can be allowed to be less than that of the interior storage space, so long as the constant differential pressure is maintained In other words, the pressure value of (X) is negative and maintained within some selected value range.

In this case, the annulus can begin charging once the pressure in storage reaches the value of (X). The pressure in the annulus will track the pressure in the annulus to maintain the constant pressure differential (X). The value (X) also represents the minimum operational limit of the storage in this scenario. Other arrangements are contemplated, so these are merely exemplary and are not limiting.

It has been determined that one primary mechanism that promotes hydrogen induced embrittlement and failure relates to the mechanical deformation (e.g., expansion and relaxation) of a liner due to changes in storage pressure. It is common to provide one or more layers of an inhibitor (coating) to help retain the stored hydrogen (or other gas) within the interior of a vessel. However, defects in this protective inhibitor coating can develop over time and multiple expansion and contraction cycles. Once penetrated, the hydrogen or other stored gas can more readily flow into, react with or otherwise mechanically weaken the liner material, leading to microcracks and eventual failure of the vessel.

By maintaining a nominally constant differential pressure upon the most vulnerable parts of an inner liner, the operational stress and strain can be reduced below the threshold for the formation of defects and microcracks in the material or inhibitor layer, and the useful operational life of the device can be extended.

In some non-limiting embodiments, the pressure within the annulus is maintained to be within about 1000 psi of the pressure within the interior storage space, and the interior storage space can be pressurized from a value of essentially zero (e.g., ATM standard pressure) up to a value of about 12,000 psi or more. Other ranges and values can be used as desired, so these values are merely exemplary and are not limiting.

Figure 23:
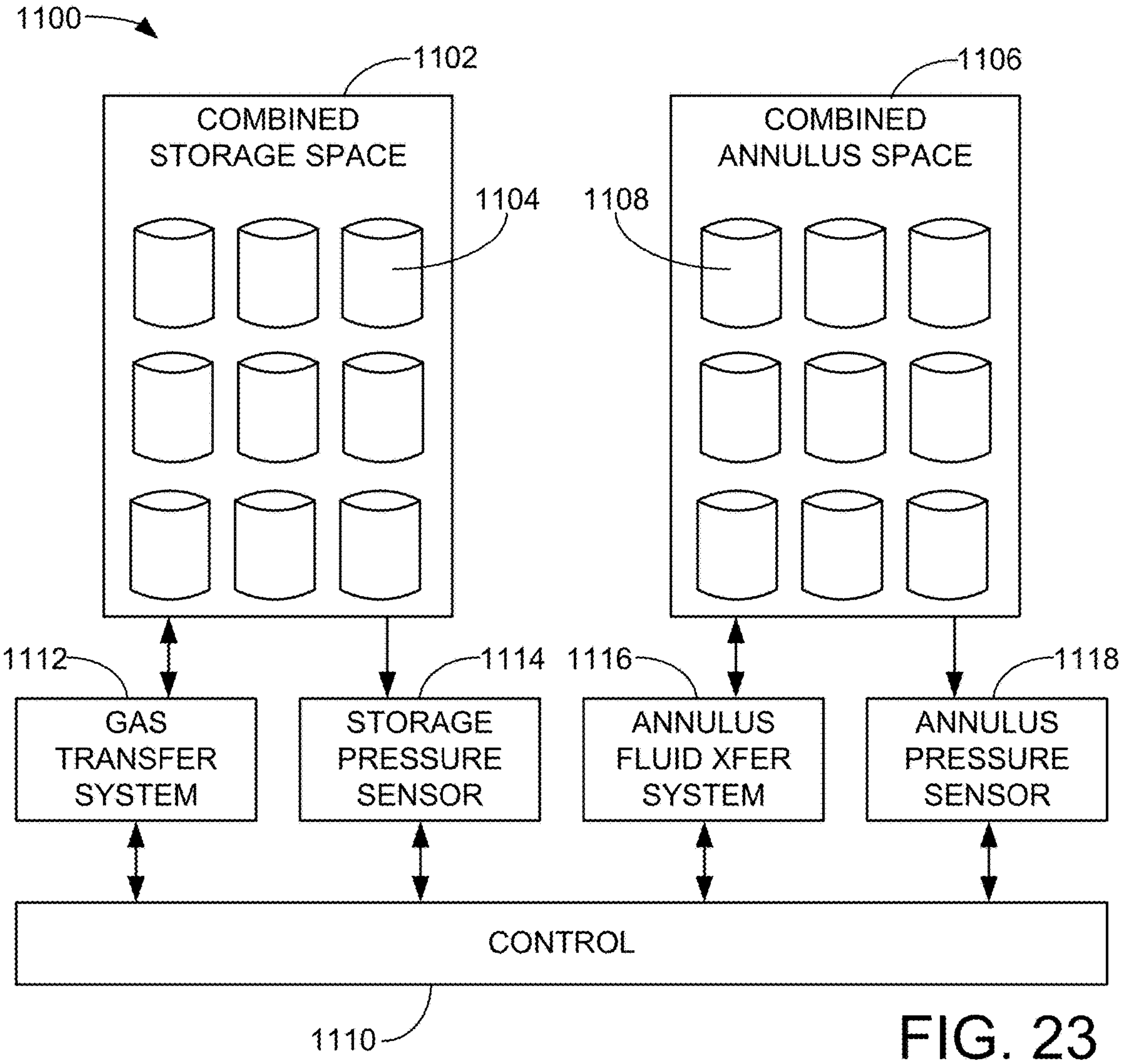
FIG. 23 shows another subsurface gas storage system in accordance with further embodiments.

FIG. 23 is a functional block representation of yet another subsurface storage system 1100 in accordance with further embodiments. The system 1100 is similar to the systems described above and includes a combined gas storage space 1102 made up of the interior storage spaces 1104 of various containers. While interior valving can be used to isolate the storage containers, it is contemplated that the interior storage spaces 1104 may be placed into fluidic communication to treat all of the interior spaces as one larger, combined space at a common storage pressure and which provides an overall volume of gas storage (such as H2).

In one example, the combined storage space 1102 may be the combined storage space of some or all of the storage containers within a single pod. In another example, the combined storage space 1102 may represent the storage space of multiple adjacent pods within a larger pod farm.

The system 1100 in FIG. 23 further shows a combined annulus space 1106 which is made up of all of the respective annulus spaces 1108 of the containers corresponding to the combined storage space 1102. As before, valving can be supplied to individually isolate and control the annulus spaces, but it may be desirable, when treating the multiple containers as a combined storage space, to also treat the combined annulus spaces as a single combined annulus space at the same nominal pressure. In this way, control efforts to increase or decrease the pressures in the combined storage space 1102 and the combined annular space 1106 can be carried out globally across an entire storage array/pod/farm.

FIG. 23 further shows control circuitry of the system 1100 to include a control module 1110, which can correspond to the controller 1002 described above in FIG. 22. A gas transfer system 1112 can operate with the necessary conduits, metering, valving, compressors, etc. to flow the stored gas (such as H2) into and out of the combined storage space 1102. A storage pressure sensor block 1114 can include one or multiple sensors to measure the gas flow and storage volumes within the space 1102. In some cases, multiple sensors may be provided at different locations for each of the individual storage containers to provide average pressure values, identify flow characteristics, enable system adjustments, and so on.

FIG. 23 further includes an annulus fluid transfer system 1116, which can include various elements including a liquid reservoir and return, one or more pumps, relief valves, meters, check-valves, gas separators, etc. to flow the annulus fluid into and out of the combined annulus space 1106. For purposes of economies of scale, it can be useful to have one controller activate a single pump, or multiple pumps, to adjust the annulus fluid pressure within the system. Under some circumstances it may be desirable to provide an individual pump for each storage container as generally illustrated in FIGS. 18A-18D; in this embodiment, the overall control of the pumps, on either a collective or individual basis, can be coordinated by the control circuit 1110.

Finally, FIG. 23 shows an annulus pressure sensor block 1118 which, as before, can constitute one or several sensors at various locations to measure and monitor the pressure of the annulus liquid within the system. The various elements in FIG. 23 provide for efficient and effective closed loop control of the pressures within a subsurface storage system.

It will now be appreciated that the various embodiments presented here can provide a number of advantages over the existing art. Different construction types can be used to accommodate a wide variety of storage pressures, including pressures at required delivery levels. The solution is modular so that any number of containers can be coupled together to provide the desired storage capacity. The use of a non-hardening compressible fluid such as but not limited to propylene glycol enhances the interior support of the inner liner and enables the fluid to be flowed both under pressure and to facilitate servicing operations.

The aligned outer walls of the container at the lower ends of the casing facilitate ease of placement and allow closer spacing of the containers. The outwardly projecting collars at the upper ends of the containers provide stable support surfaces to allow suspended, removable placement of the containers (alone or in a group) into a well bore.

It is to be understood that even though numerous characteristics and advantages of various embodiments of the present disclosure have been set forth in the foregoing description, this description is illustrative only, and changes may be made in detail, especially in matters of structure and arrangements of parts within the principles of the present disclosure to the full extent indicated by the broad general meaning of the terms wherein the appended claims are expressed.

What is claimed is:

1. An apparatus comprising:

a subsurface storage module comprising a rigid outer casing which surrounds a rigid inner liner to define a sealed interior gas storage space within the inner liner and a sealed annulus space between the inner liner and the outer casing, the annulus space filled with a fluid comprising a non-compressible liquid; and a differential pressure control mechanism configured to maintain a differential pressure across the inner liner within a predetermined differential pressure range, the differential pressure constituting a difference between an annular pressure of the fluid within the annulus space and a storage pressure of gas within the interior storage space, the differential pressure control mechanism adjusting the annular pressure of the liquid responsive to detected changes in the storage pressure of the gas.

2. The apparatus of claim 1, wherein the differential pressure control mechanism comprises a pump which increases the annulus pressure of the fluid within the annulus space responsive to a storage space filling operation to increase the storage pressure of gas within the interior gas storage space as the gas is introduced into the storage space, and a relief valve which decreases the annulus pressure of the fluid within the annulus space responsive to a storage space drawing operation to decrease the storage pressure of the gas within the interior gas storage space as the gas is removed from the storage space.

3. The apparatus of claim 1, wherein the fluid is introduced into the annulus space by steps comprising:

applying a negative pressure to the annulus space;

using the negative pressure to draw the fluid into the annulus space until the annulus space is nominally filled with the fluid;

recirculating the fluid in the annulus space to remove gas bubbles within the fluid; and pressurizing the fluid to a desired level.

4. The apparatus of claim 3, wherein the negative pressure is generated using a vacuum source, and the recirculation and pressurization of the fluid is carried out using a high pressure pump.

5. The apparatus of claim 1, wherein gas is introduced into the interior storage space by steps comprising:

pre-charging the fluid within the annulus space to an initial fluid pre-charge pressure level;

introducing the gas into the interior storage space at a selected rate to increase the gas pressure from an initial gas pressure level to a higher, final gas pressure level; and increasing the pressure of the fluid within the annulus space from the initial fluid pre-charge pressure level to a final fluid pressure level.

6. The apparatus of claim 5, wherein the pressure of the fluid within the annulus space is increased responsive to the gas pressure exceeding the initial fluid pre-charge pressure level so that the pressure of the fluid increases at nominally the same rate as the gas pressure.

7. The apparatus of claim 5, wherein the differential pressure control mechanism comprises a pump used during the introducing of the gas into the interior storage space to increase the pressure of the fluid.

8. The apparatus of claim 5, wherein the initial fluid pre-charge pressure level is selected to exert an inwardly directed force upon the inner liner that is less than a maximum collapse strength of the inner liner, and wherein the final fluid pressure level is selected to exert an outwardly directed force upon the outer casing that is less than ⅔rds of a maximum collapse strength of the outer casing.

9. The apparatus of claim 5, wherein a total storage pressure comprises a sum of the final gas pressure level and the final fluid pressure level, and the total storage pressure is selected to exert an outwardly directed force upon the outer casing that is less than a maximum collapse strength of the outer casing.

10. The apparatus of claim 5, wherein the differential pressure across the inner liner is maintained at a level corresponding to less than ⅔rds of a maximum collapse strength of the inner liner.

11. The apparatus of claim 1, wherein the differential pressure control mechanism comprises a fluid recirculation pump that maintains the differential pressure across the rigid inner liner within the predetermined differential pressure range.

12. The apparatus of claim 1, wherein the differential pressure control mechanism comprises at least one pressure sensor configured to sense a pressure within at least one of the interior storage space or the annulus space.

13. The apparatus of claim 1, wherein the storage module is a first storage module of a pod assembly comprising a plurality of additional storage modules suspended in a subsurface well bore by a support plate, wherein each of the plurality of additional storage modules is nominally identical to the first storage module to define a corresponding sealed interior gas storage space and a sealed annulus space, wherein the interior gas storage space of the first storage module and each of the plurality of additional storage modules are in fluidic communication to define a combined gas storage space, wherein the annulus space of the first storage module and each of the plurality of additional storage modules are in fluidic communication to define a combined annulus space, and wherein the differential pressure control mechanism operates upon the combined annulus space to maintain the differential pressure within the predetermined differential pressure range.

14. The apparatus of claim 1, wherein the fluid comprises glycol at a concentration of nominally 35% at vol. or greater.

15. The apparatus of claim 1, wherein the gas stored in the interior storage space is characterized as hydrogen (H2) gas or methane (CH4) gas.

16. A subsurface gas storage system, comprising:

a storage pod comprising a plurality of storage modules suspended from a support plate into a well bore, each of the storage modules comprising a rigid outer casing which surrounds a rigid inner liner to define a sealed interior gas storage space within the inner liner and a sealed annulus space between the inner liner and the outer casing, wherein the sealed interior gas storage space of each of the plurality of storage modules is placed in fluidic communication to provide a combined storage space, wherein the sealed annular space of each of the plurality of storage modules is placed in fluidic communication to provide a combined annulus space, and wherein the combined annulus space filled with a fluid comprising a non-compressible liquid; and a differential pressure control mechanism configured to maintain a differential pressure across the inner liner within a predetermined differential pressure range, the differential pressure constituting a difference between an annular pressure of the fluid within the combined annulus space and a storage pressure of gas within the combined storage space, the differential pressure control mechanism comprising at least one pump configured to recirculate the fluid within the combined annulus space and at least one pressure relief valve configured to release the fluid from the combined annulus space.

17. The system of claim 16, wherein the storage pod is a first storage pod, and the system comprises a plurality of additional storage pods each nominally identical to and in fluidic communication with the first storage pod in a pod farm arrangement.

18. The system of claim 16, further comprising at least one storage pressure sensor configured to measure a pressure of the gas stored in the combined storage space and at least one annulus pressure sensor configured to measure a pressure of the fluid in the combined annulus space.

19. The system of claim 16, further comprising a control circuit having a programmable processor and associated programming in a memory configured to adjust the pressure of the fluid in the combined annulus space responsive to a filling or dispensing operation upon the combined storage space.

20. The system of claim 16, wherein the fluid comprises glycol, the gas comprises hydrogen (H2) and the differential pressure range is 1000 psi or less.

* * * * *